(12) United States Patent
Morishima

(10) Patent No.: US 7,129,968 B2
(45) Date of Patent: Oct. 31, 2006

(54) IMAGE FORMING APPARATUS CAPABLE OF FORMING IMAGE ON OPTICAL DISK, AND IMAGE FORMING METHOD

(75) Inventor: Morito Morishima, Fukuroi (JP)

(73) Assignee: Yamaha Corporation, Hamamatsu (JP)

(*) Notice: Subject to any disclaimer, the term of this patent is extended or adjusted under 35 U.S.C. 154(b) by 343 days.

(21) Appl. No.: 10/448,707

(22) Filed: May 30, 2003

(65) Prior Publication Data

US 2003/0231561 A1     Dec. 18, 2003

(30) Foreign Application Priority Data

May 31, 2002   (JP) .......................... P.2002-160486

(51) Int. Cl.
*G11B 7/125*     (2006.01)
(52) U.S. Cl. ..................... 347/253; 347/225; 347/248
(58) Field of Classification Search ................ None
See application file for complete search history.

(56) References Cited

U.S. PATENT DOCUMENTS

| | | | |
|---|---|---|---|
| 4,027,217 A | 5/1977 | Harman | |
| 4,066,268 A | 1/1978 | Borchard et al. | |
| 4,622,564 A | 11/1986 | Kaku et al. | |
| 4,814,594 A | 3/1989 | Drexler | |
| 4,899,224 A | 2/1990 | Ooba et al. | |
| 4,967,286 A | 10/1990 | Nomula et al. | |
| 5,126,995 A | 6/1992 | Nishizawa | |
| 5,182,741 A | 1/1993 | Maeda et al. | |
| 5,317,337 A | 5/1994 | Ewaldt | |
| 5,398,231 A | 3/1995 | Shin et al. | |
| 5,444,687 A | 8/1995 | Okumura | |
| 5,467,432 A * | 11/1995 | Ota ........................... | 358/1.13 |
| 5,498,509 A | 3/1996 | Shin et al. | |
| 5,504,688 A | 4/1996 | Letourneau | |
| 5,518,325 A | 5/1996 | Kahle | |
| 5,608,717 A | 3/1997 | Ito et al. | |
| 5,608,718 A | 3/1997 | Schiewe | |
| 5,616,447 A | 4/1997 | Arioka | |
| 5,627,895 A | 5/1997 | Owaki | |
| 5,669,995 A | 9/1997 | Hong | |
| 5,675,570 A | 10/1997 | Ohira et al. | |
| 5,688,173 A | 11/1997 | Kitahara et al. | |
| 5,729,533 A | 3/1998 | Marquardt | |

(Continued)

FOREIGN PATENT DOCUMENTS

EP          0 329 122 B1    11/1993

(Continued)

*Primary Examiner*—Thang V. Tran
*Assistant Examiner*—Joseph Haley
(74) *Attorney, Agent, or Firm*—Pillsbury Winthrop Shaw Pittman LLP

(57) ABSTRACT

An image forming apparatus includes: a spindle motor (130) for rotating an optical disk (200); an optical pick-up (100) for applying laser light to the optical disk which moves in a radial direction of the optical disk; a stepping motor (140) for transporting the optical pick-up in the radial direction by a predetermined distance every time the optical disk is rotated plural times; a tracking actuator for actuating a position of laser light irradiated from the optical pick-up; a servo circuit (138) for controlling the tracking actuator in such a manner that irradiation loci of the laser light is made different from each other every time the optical disk is rotated plural times; and a data converter (160) for defining intensity of the laser light in accordance with gradation of dots to be arrayed and a total rotation time of the optical disk.

19 Claims, 19 Drawing Sheets

U.S. PATENT DOCUMENTS

| | | | |
|---|---|---|---|
| 5,745,457 A | 4/1998 | Hayashi et al. |
| 5,748,607 A | 5/1998 | Ohira et al. |
| 5,751,671 A | 5/1998 | Koike et al. |
| 5,764,430 A | 6/1998 | Ottesen et al. |
| 5,766,495 A | 6/1998 | Parette |
| 5,781,221 A | 7/1998 | Wen et al. |
| 5,846,131 A | 12/1998 | Kitahara |
| 5,866,354 A | 2/1999 | Froman |
| 5,869,420 A | 2/1999 | Naito |
| 5,875,156 A | 2/1999 | Ito et al. |
| 5,915,858 A | 6/1999 | Wen |
| 5,949,752 A | 9/1999 | Glynn et al. |
| 5,958,651 A | 9/1999 | van Hoof et al. |
| 5,967,676 A | 10/1999 | Cutler et al. |
| 5,997,976 A | 12/1999 | Mueller et al. |
| 6,019,151 A | 2/2000 | Wen et al. |
| 6,020,977 A | 2/2000 | Kim |
| 6,026,066 A | 2/2000 | Maezawa |
| 6,034,930 A | 3/2000 | Kitahara |
| 6,074,031 A | 6/2000 | Kahle |
| 6,102,800 A | 8/2000 | Kitahara et al. |
| 6,104,677 A | 8/2000 | Kirihara et al. |
| 6,109,324 A | 8/2000 | Bugner et al. |
| 6,124,011 A | 9/2000 | Kern |
| 6,154,240 A | 11/2000 | Hickman |
| 6,160,789 A | 12/2000 | Abraham |
| 6,202,550 B1 | 3/2001 | Lee et al. |
| 6,264,295 B1 | 7/2001 | Bradshaw et al. |
| 6,270,176 B1 | 8/2001 | Kahle |
| 6,295,261 B1 | 9/2001 | Kim |
| 6,310,838 B1 | 10/2001 | Heemskerk et al. |
| 6,317,392 B1 | 11/2001 | Lee et al. |
| 6,317,399 B1 | 11/2001 | Ohtani et al. |
| 6,329,035 B1 | 12/2001 | Iwasaki et al. |
| 6,384,929 B1 | 5/2002 | Miller |
| 6,386,667 B1 | 5/2002 | Cariffe |
| 6,403,191 B1 | 6/2002 | Casagrande |
| 6,440,248 B1 | 8/2002 | Mueller |
| 6,452,883 B1 | 9/2002 | Chan |
| 6,469,969 B1 | 10/2002 | Carson et al. |
| 6,501,718 B1 | 12/2002 | Ono et al. |
| 6,532,034 B1 | 3/2003 | Hirotsune et al. |
| 6,534,142 B1 | 3/2003 | Hummell et al. |
| 6,556,234 B1 | 4/2003 | Koyama |
| 6,596,358 B1 | 7/2003 | Sakamoto et al. |
| 6,654,324 B1 | 11/2003 | Huber et al. |
| 6,771,297 B1 | 8/2004 | Bronson |
| 6,778,205 B1 | 8/2004 | Anderson et al. |
| 6,844,889 B1 | 1/2005 | Bronson |
| 6,862,033 B1 | 3/2005 | McClellan |
| 6,864,907 B1 | 3/2005 | Bronson |
| 6,903,760 B1 | 6/2005 | McFarland et al. |
| 2001/0026531 A1 | 10/2001 | Onodera et al. |
| 2001/0040867 A1 | 11/2001 | Onodera et al. |
| 2002/0046177 A1 | 4/2002 | Oshima et al. |
| 2002/0048241 A1 | 4/2002 | Kumagai et al. |
| 2002/0191517 A1* | 12/2002 | Honda et al. ............ 369/53.29 |
| 2003/0107959 A1 | 6/2003 | Norton et al. |
| 2003/0108708 A1 | 6/2003 | Anderson et al. |

FOREIGN PATENT DOCUMENTS

| | | |
|---|---|---|
| EP | 0771677 | 5/1997 |
| EP | 0 682 341 B1 | 12/1999 |
| EP | 0 762 407 B1 | 5/2001 |
| GB | 2 277 827 A | 9/1994 |
| JP | 58-100235 | 6/1983 |
| JP | 59-38932 | 3/1984 |
| JP | 5225570 | 3/1993 |
| JP | 8327339 | 12/1996 |
| JP | 9123606 | 5/1997 |
| JP | 9-245371 | 9/1997 |
| JP | 9265760 | 10/1997 |
| JP | 9-306144 | 11/1997 |
| JP | 10302316 | 11/1998 |
| JP | 10320963 | 12/1998 |
| JP | 11003543 | 1/1999 |
| JP | 11-96561 | 4/1999 |
| JP | 11-110820 | 4/1999 |
| JP | 11-161768 | 6/1999 |
| JP | 11283356 | 10/1999 |
| JP | 2000105947 | 4/2000 |
| JP | 2000-169960 | 6/2000 |
| JP | 2000155989 | 6/2000 |
| JP | 2000173096 | 6/2000 |
| JP | 2000173238 | 6/2000 |
| JP | 2000251387 | 9/2000 |
| JP | 2002-216396 | 2/2002 |

\* cited by examiner

FIG. 7

REFERENCE LINE

<GRADATION DATA>

| COLUMN / ROW | 1 | 2 | 3 | 4 | 5 | 6 | 7 | ... | FINAL "n" COLUMN |
|---|---|---|---|---|---|---|---|---|---|
| FINAL "m" ROW | (000) | (000) | (000) | (000) | (000) | (000) | (000) | ... | (000) |
| ... | | | | | | | | | |
| 5 | (101) | (100) | (011) | (100) | (110) | (100) | (111) | ... | (100) |
| 4 | (000) | (000) | (000) | (000) | (000) | (000) | (000) | ... | (000) |
| 3 | (100) | (100) | (100) | (011) | (100) | (011) | (000) | ... | (011) |
| 2 | (000) | (100) | (000) | (000) | (001) | (010) | (000) | ... | (000) |
| 1 | (000) | (000) | (000) | (000) | (000) | (000) | (000) | ... | (000) |

FIG. 9

<ON/OFF TABLE OF LASER LIGHT>

| | GRADATION DATA | | | | | | | |
|---|---|---|---|---|---|---|---|---|
| | (000) | (001) | (010) | (011) | (100) | (101) | (110) | (111) |
| 1st ROTATION (①) | OFF | ON | ON | ON | ON | ON | ON | ON |
| 2nd ROTATION (②) | OFF | OFF | ON | ON | ON | ON | ON | ON |
| 3rd ROTATION (③) | OFF | OFF | OFF | ON | ON | ON | ON | ON |
| 4th ROTATION (④) | OFF | OFF | OFF | OFF | ON | ON | ON | ON |
| 5th ROTATION (⑤) | OFF | OFF | OFF | OFF | OFF | ON | ON | ON |
| 6th ROTATION (⑥) | OFF | OFF | OFF | OFF | OFF | OFF | ON | ON |
| 7th ROTATION (⑦) | OFF | OFF | OFF | OFF | OFF | OFF | OFF | ON |

FIG. 14

| ROW \ COLUMN | j | j+1 | j+2 | j+3 | j+4 | j+5 | j+6 | j+7 | j+8 |
|---|---|---|---|---|---|---|---|---|---|
| i+8 | (000) | (000) | (000) | (000) | (000) | (000) | (000) | (000) | (000) |
| i+7 | (000) | (000) | (000) | (111) | (111) | (111) | (000) | (000) | (000) |
| i+6 | (000) | (000) | (111) | (111) | (000) | (111) | (111) | (000) | (000) |
| i+5 | (000) | (111) | (111) | (000) | (000) | (000) | (111) | (111) | (000) |
| i+4 | (000) | (111) | (111) | (000) | (000) | (000) | (111) | (111) | (000) |
| i+3 | (000) | (111) | (111) | (111) | (111) | (111) | (111) | (111) | (000) |
| i+2 | (000) | (111) | (111) | (000) | (000) | (000) | (111) | (111) | (000) |
| i+1 | (000) | (111) | (111) | (000) | (000) | (000) | (111) | (111) | (000) |
| i | (000) | (000) | (000) | (000) | (000) | (000) | (000) | (000) | (000) |

<CONTRAST PRIORITY MODE>

----- DISCOLORED PORTION

FIG. 17

| ROW | j | j+1 | j+2 | j+3 | j+4 | j+5 | j+6 | j+7 | COLUMN |
|---|---|---|---|---|---|---|---|---|---|
| i+7 | (111) | (111) | (111) | (111) | (111) | (111) | (111) | (111) | |
| i+6 | (110) | (110) | (110) | (110) | (110) | (110) | (110) | (110) | |
| i+5 | (101) | (101) | (101) | (101) | (101) | (101) | (101) | (101) | |
| i+4 | (100) | (100) | (100) | (100) | (100) | (100) | (100) | (100) | |
| i+3 | (011) | (011) | (011) | (011) | (011) | (011) | (011) | (011) | |
| i+2 | (010) | (010) | (010) | (010) | (010) | (010) | (010) | (010) | |
| i+1 | (001) | (001) | (001) | (001) | (001) | (001) | (001) | (001) | |
| i | (000) | (000) | (000) | (000) | (000) | (000) | (000) | (000) | |

FIG. 19

<ON/OFF TABLE OF LASER LIGHT>

| | \multicolumn{8}{c}{GRADATION DATA} | | | | | | | |
|---|---|---|---|---|---|---|---|---|
| | (000) | (001) | (010) | (011) | (100) | (101) | (110) | (111) |
| 1st ROTATION (①) | OFF | ON | ON | ON | ON | ON | ON | ON |
| 2nd ROTATION (②) | OFF | OFF | OFF | OFF | OFF | ON | ON | ON |
| 3rd ROTATION (③) | OFF | OFF | OFF | ON | ON | OFF | ON | ON |
| 4th ROTATION (④) | OFF | OFF | ON | OFF | OFF | ON | ON | ON |
| 5th ROTATION (⑤) | OFF | OFF | OFF | ON | ON | ON | ON | ON |
| 6th ROTATION (⑥) | OFF | OFF | OFF | OFF | OFF | ON | ON | ON |
| 7th ROTATION (⑦) | OFF | OFF | OFF | OFF | ON | OFF | OFF | ON |

IMAGE FORMING APPARATUS CAPABLE OF FORMING IMAGE ON OPTICAL DISK, AND IMAGE FORMING METHOD

BACKGROUND OF THE INVENTION

The present invention is related to an image forming apparatus for forming an image on an optical disk, and to an image forming method.

Generally, recordable optical disks such as CD-R (Compact Disk-Recordable) and CD-RW (Compact Disk-Rewritable) have been widely used for recording a large capacity of information. Optical disk recording apparatus for recording various sorts of information such as music data on these optical disks are constituted so that laser a recording plane formed on one of side planes of these optical disk is irradiated with laser light in response to information to be recorded.

In the above-explained optical disks, in order to identify various sorts of data which have been recorded on the recording planes, in many cases, images such as titles have been applied onto the other side of label planes opposite to the one of the side recording planes. In general, these images are applied in such a manner that the images such as the titles are printed out on label sheets by employing printer apparatus and the like, and also, these image-printed label sheets are stuck to the label planes of the optical disks.

However, in order to apply the images such as the titles to the optical disks as explained above, since the printer apparatus must be separately employed in addition to the optical disk recording apparatus, economical loads given to users are increased. Furthermore, such cumbersome works are forcibly given to these users. That is, after the information has been recorded on the recording planes of the optical disks by employing the optical disk recording apparatus, it is not only work of picking up the information-recorded optical disks from the optical disk recording apparatus, but also, the label sheets must be printed by using the above-described printer apparatus, and the printed label sheets must be stuck to these information-recorded optical disks.

SUMMARY OF THE INVENTION

The present invention has been made to solve the above-described problem, and has an object to provide an image forming apparatus and an image forming method, capable of forming images in high contrast ratios with respect to optical disks in addition to information recorded on the recording planes, while no additional apparatus is newly employed.

In order to solve the aforesaid object, the invention is characterized by having the following arrangement.

First Aspect

An image forming apparatus for forming an image on an optical disk, comprising:

a rotating unit which rotates the optical disk;

a light applying unit movable in a substantially radial direction of the optical disk for applying laser light to the optical disk rotated by the rotating unit;

a feeding unit which feeds the light applying unit in the substantially radial direction by a predetermined distance every time the optical disk is rotated predetermined plural times by the rotating unit;

an irradiation position operating unit which operates a position of the laser light which is emitted from the light applying unit toward the optical disk;

an irradiation position control unit which controls the irradiation position operating means so that irradiation loci of the laser light on the optical disk is made different from each other every rotation; and a laser light intensity defining unit which defines intensity of the laser light based on both gradation of dots to be arrayed on a circumference of the optical disk and a total rotation time of the optical disk.

Second Aspect

The image forming apparatus of the first aspect, wherein the optical disk includes a discoloration layer which is discolored by the laser light applied by the light applying unit.

Third Aspect

The image forming apparatus of the first aspect, wherein the irradiation position operating unit operates the position of the laser light in response to a voltage of a tracking signal; and the irradiation position control unit produces the tracking signal equivalent to a DC signal in such a manner that the voltage of the DC tracking signal is made difference from each other during the optical disk is rotated the predetermined plural times by the rotating unit.

Fourth Aspect

The image forming apparatus of the first aspect, wherein the irradiation position operating unit operates the position of the laser light in response to a voltage of a tracking signal; and the irradiation position control unit produces the tracking signal having a constant amplitude and a constant frequency in which a phase of the tracking signal is made difference from each other during the optical disk is rotated the predetermined plural times by the rotating unit.

Fifth Aspect

The image forming apparatus of the first aspect, wherein the laser light intensity defining unit defines intensity of the laser light so that the higher density of a dot is increased, the lager a total irradiation time of the laser light having intensity capable of discoloring the optical disk is increased.

Sixth Aspect

The image forming apparatus of the fifth aspect, wherein the image forming apparatus includes at least a first mode in which contrast of an image to be formed owns a priority. and a second mode in which shortening of a time required to form an image to be formed owns a priority; and in the case that the second mode is set, a total rotation time required to form dots which should be arrayed on the same circumference is reduced as compared with a total rotation time of such a case that the first mode is set.

Seventh Aspect

The image forming apparatus of the first aspect, further comprising a judging unit which judges whether or not the laser light having the intensity capable of discoloring the discoloration layer is required to be applied over the predetermined plural rotation times before the optical disk is rotated the predetermined plural times by the rotating unit in order to form dots which should be arrayed on one circumference.

wherein in the case that a judgment result is no, the judging unit instructs the feeding unit to move the light irradiating unit without waiting for such an operation that the optical disk is rotated the predetermined plural times.

Eighth Aspect

The image forming apparatus of the first aspect, further comprising a judging unit which judges whether or not the laser light having the intensity capable of discoloring the discoloration layer is required to be applied over the predetermined plural rotation times before the optical disk is rotated the predetermined plural times by the rotating unit in order to form dots which should be arrayed on one circumference, wherein in the case that a judgment result is no, the judging unit cancels the irradiation of the laser light in the rotation time where the judgment result is no.

Ninth Aspect

An image forming method of forming an image on an optical disk, the method comprising the steps of:

moving an optical pick-up for applying laser light to the optical disk in a substantially radial direction of the optical disk by a predetermined disk every time the optical disk is rotated predetermined plural times;

controlling an irradiation position of the laser light during the optical disk is rotated the predetermined plural times in such a manner that irradiation loci of the laser light on the optical disk is different from each other every rotation; and defining intensity of the laser light based on both gradation of dots which should be arrayed on a circumference of the optical disk and a total rotation time of the optical disk.

Tenth Aspect

A apparatus for applying laser light on an optical disk comprising:

a data storing unit which stores data to be recorded on the optical disk;

a rotating unit which rotates the optical disk;

a light applying unit movable in a substantially radial direction of the optical disk for applying laser light to the optical disk rotated by the rotating unit;

a first position control unit which moves the light applying unit to next column of the optical disk in a radial direction of the optical disk based on the data;

a second position control unit which control the light applying unit to avoid tracking a same locus of the laser light on the optical disk; and a laser light control unit which defines intensity of the laser light based on the data.

Eleventh Aspect

The apparatus of the tenth aspect, wherein the data is image data including gradation data of an image to be formed on the optical disk.

Twelfth Aspect

The apparatus according to the eleventh aspect, wherein the second position control unit controls the laser light while the first position control unit fixes the laser light applying unit for representing gradation of the image.

Thirteenth Aspect

The apparatus according to the tenth aspect, wherein the second position control unit vibrates the laser light applied to the optical disk at a predetermined frequency and changes phase of the vibration of the laser light every rotation of the optical disk by the rotating unit.

Fourteenth Aspect

The apparatus according to the tenth aspect, wherein the first position control unit moves the laser light applying unit by a first predetermined distance, and the second position control unit moves the laser light by a second predetermined distance shorter than the first distance.

BRIEF DESCRIPTION OF THE DRAWINGS

FIG. 7 is a diagram for explaining storage contents of a frame memory.

FIG. 9 is a diagram for explaining converted contents of a data converter employed in the image forming apparatus.

FIG. 14 is a diagram for explaining an example of storage contents of the frame memory.

FIG. 17 is a diagram for explaining an example of storage contents of the frame memory.

FIG. 19 is a diagram for explaining converted contents of a data converter related to an application example of the image forming apparatus.

DETAILED DESCRIPTION OF PREFERRED EMBODIMENTS

With reference to accompanying drawings, embodiments according to the present invention will be described.

<Image Forming Apparatus Capable of Forming Image on Optical Disk>

An image forming apparatus capable of forming an image on an optical disk (will be simply referred to as "image forming apparatus" hereinafter), according to the embodiment of the present invention, is arranged as follows. That is, in addition to a general-purpose information recording function realized by irradiating with laser light a recording plane of an optical disk so as to record information on this recording plane, such an image forming function is newly added to this image forming apparatus, by which an image is formed by irradiating with laser light a discoloration layer which is provided on the optical disk and may be discolored by either heat or light.

To this end, a construction of an optical disk which constitutes an initial condition of forming images is firstly explained. Thereafter, an arrangement of such an apparatus for performing both an information recording operation and an image forming operation with respect to this optical disk will be described. It should be understood that since a function capable of reading out recorded information corresponds merely to the general-purpose technique, a detailed description thereof is omitted.

<Construction of Optical Disk>

Figure 4:
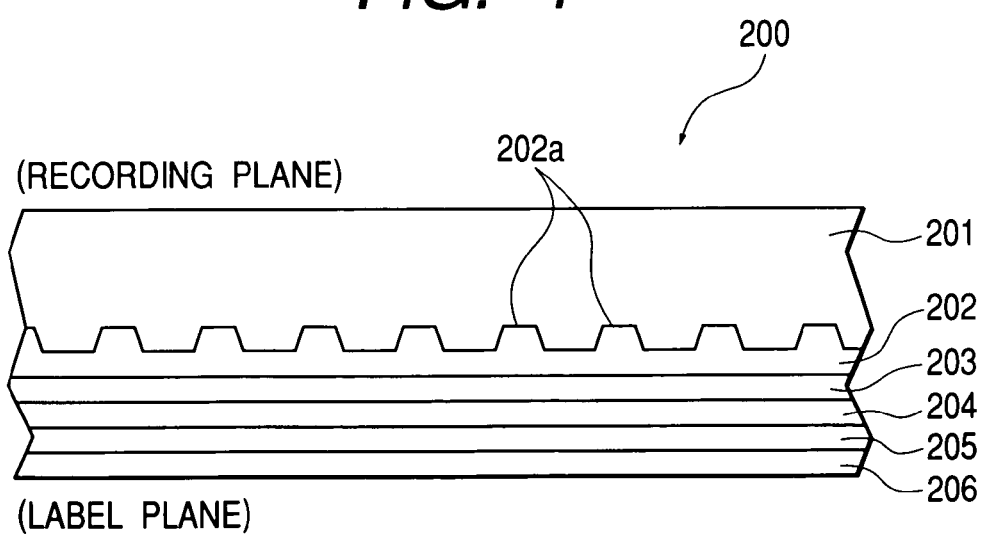
FIG. 4 is a sectional view for indicating a construction of an optical disk on which information is recorded, or an image is formed by the image forming apparatus.

FIG. 4 is a cross-sectional view showing a construction of an optical disk in which information is to be recorded on one disk plane and an image is to be recorded on the other disk plane. As shown in this drawing, an optical disk 200 is constituted by a protection layer 201, a recording layer 202, a reflection layer 203, another protection layer 204, a heat-sensitive layer 205, and another protection layer 206 which are stacked in this order. It should be noted that FIG. 4 illustratively shows the schematic structure of the optical disk 200, and therefore, dimension ratios of the respective layers are not always correctly reflected onto actual dimensions.

Of these layers, a groove (namely, guide groove, generally speaking, called as track) 202a is formed in the recording layer 202. When information is recorded on this optical disk 200, laser light is applied along this groove 202a.

In other words, when the information is recorded, a plane (recording plane) of this optical disk 200, which is located on the side (i.e., upper side as viewed in this drawing) of the protection layer 201, is set to be located opposite to an optical pick-up 100 (see FIG. 1), and target information is recorded by irradiating the plane with laser light along the above-described groove 202a in response to information (bits) to be recorded thereon. On the other hand, information is reproduced by demodulating laser light returned from the emitted laser light, namely by demodulating a reception signal indicative of this returned laser light.

On the other hand, when the optical disk 200 is irradiated with laser light having intensity higher than, or equal to predetermined intensity, the heat-sensitive layer 205 is discolored by either heat or light of this applied laser light. As a consequence, in the case that an image is to be formed on this optical disk 200, a plane (namely, label plane) of this optical disk 200, which is located on the side of the protection layer 206, is set to be located opposite to the optical pick-up, and such a target image is formed by irradiating the plane with a laser light having sufficiently high intensity capable of discoloring the heat-sensitive layer 205.

It should be understood that since the optical disk 200 owns the substantially same construction as that of the conventionally used CD-R except for the structural element of the heat-sensitive layer 205, explanations of a further detailed construction thereof are omitted.

Further, in the embodiment, a description will be made of such a case that the heat-sensitive layer 205 is employed as a discoloration layer. Alternatively, as will be later discussed in applications/modifications, the recording layer 202 may be employed as this discoloration layer 202.

<Arrangement of Image Forming Apparatus for Optical Disk>

Figure 1:
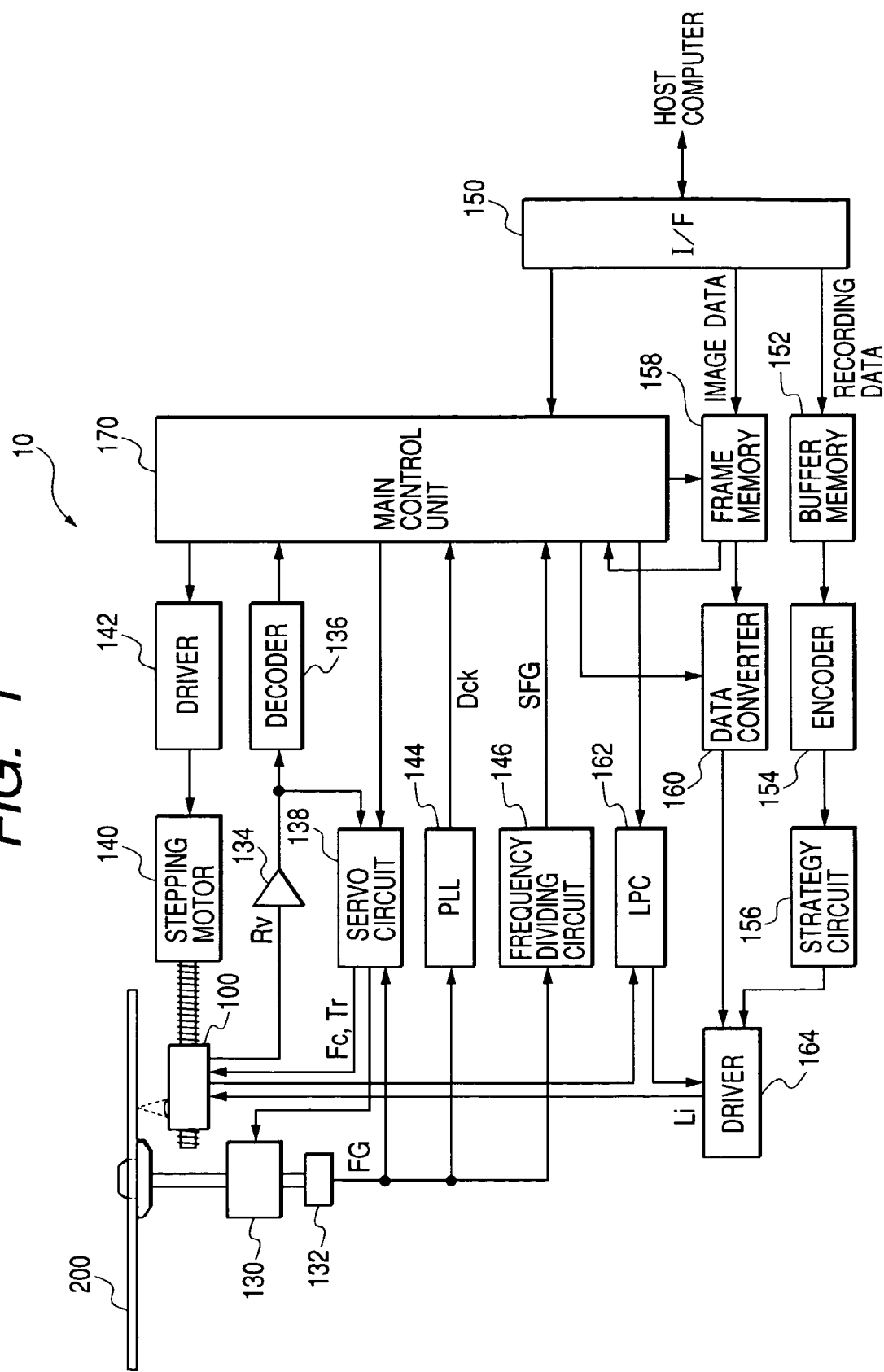
FIG. 1 is a block diagram for showing an arrangement of an image forming apparatus capable of forming an image on an optical disk, according to an embodiment of the present invention.

Next, FIG. 1 is a block diagram showing an arrangement of an image forming apparatus 10 according to this embodiment. As shown in this drawing, this image forming apparatus 10 includes an optical pick-up 100, a spindle motor 130, a rotation detector 132, an RF (Radio Frequency) amplifier 134, a decoder 136, a servo circuit 138, a stepping motor 140, a motor driver 142, a PLL (Phase-Locked Loop) 144, a frequency dividing circuit 146, an interface 150, a buffer memory 152, an encoder 154, a strategy circuit 156, a frame memory 158, a data converter 160, a laser power control (LPC) circuit 162, a laser driver 164, and a main control unit 170. The image forming apparatus 10 is connected via the interface 150 to a host computer (not shown in detail).

The spindle motor 130 (rotating unit) rotates the optical disk 200 which is used to record thereon information, or form thereon an image. The rotation detector 132 corresponds to a kind of frequency tachometer generator which outputs a signal "FG" having a frequency responding to a spindle rotation speed by utilizing a counter electromotive current of the spindle motor 130.

Since the image forming apparatus 10 according to this embodiment records the information and forms the image in the CAV (Constant Angular Velocity) system, a feedback control is carried out by a servo circuit 138 in such a manner that the rotation speed of the spindle motor 130 which is detected by the signal FG may become equal to an angular speed instructed from the main control unit 170. It should be noted that the servo circuit 138 performs not only the rotation control on the spindle motor 130, but also a tracking control and a focusing control on the optical pick-up 100.

Figure 2:
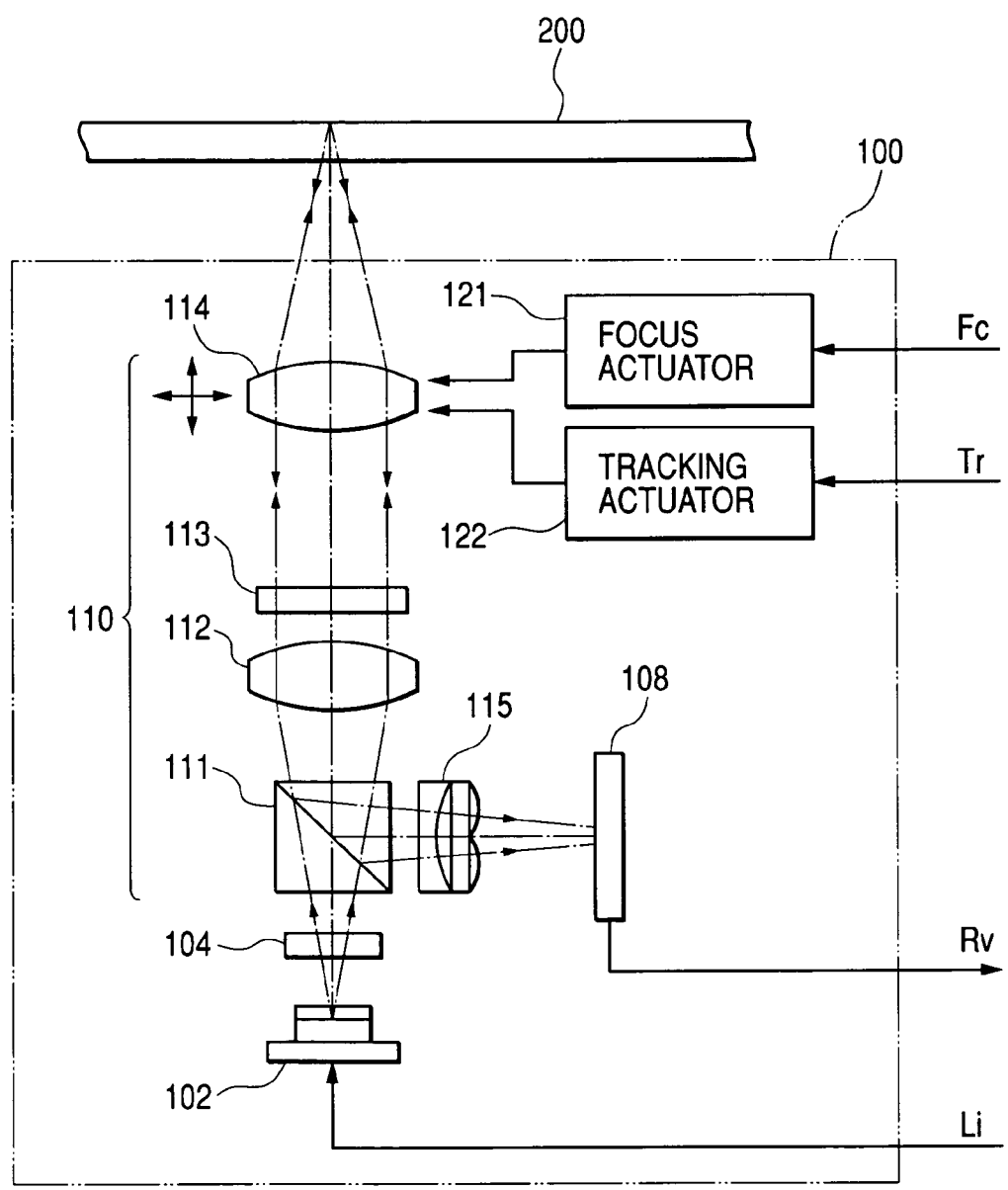
FIG. 2 is a block diagram for representing a construction of an optical pick-up employed in the image forming apparatus.

The optical pick-up 100 (optical irradiating unit) corresponds to a block for irradiating the optical disk 200 to be rotated with laser light. A detailed construction of this optical pick-up 100 is indicated in FIG. 2. As shown in this drawing, the optical pick-up 100 is provided with a laser diode 102 for emitting a laser beam, a diffraction grating 104, an optical system 110 for condensing the laser beam to the optical disk 200, and a light receiving element 108 for receiving reflection laser light (returned laser light).

The laser diode 102 is driven by a drive signal "Li" supplied from the laser driver 164 (see FIG. 1) so as to emit a laser beam with intensity corresponding to a current value of this drive signal "Li." The laser beam emitted from the laser diode 102 is separated into a main beam and two sub-beams by the diffraction grating 104, and thereafter, these separated laser beams are passed through the optical system 110 constituted by a polarization beam splitter 111, a collimator lens 112, a ¼-wavelength plate 113, and an objective lens 114 in this order, and then are condensed onto the optical disk 200.

On the other hand, the three laser beams reflected from the optical disk 200 are again passed through the objective lens 114, the ¼-wavelength plate 113, and the collimator lens 112 in this order, and then, are reflected by the polarization beam splitter 111 along a right-angle direction. The three reflected laser beams are traveled via a cylindrical lens 115 which constitutes the optical system 110 to be entered into the light receiving element 108.

A light reception signal "Rv" received by the light receiving element 108 is amplified by the RF amplifier (see FIG. 1), and thereafter, the amplified light reception signal is supplied to the servo circuit 138 and the like. It should be noted that the light receiving element 108 actually receives the main beam and two sets of the sub-beams, respectively.

In this case, as will be explained later, a detection area for receiving the main beam in the light receiving element 108 is subdivided into four detection areas, and light receiving intensity of an optical image formed by the main beam is acquired every sub-divided detection area. As a consequence, the light receiving signal Rv corresponds to a generic name for such light receiving signals indicative of four sets of the light receiving intensity.

While the objective lens 114 is held by a focus actuator 121 and a tracking actuator 122, this objective lens 114 is capable of moving along both an optical axis direction of the laser beam and the radial direction of the optical disk 200.

The focus actuator 121 actuates the objective lens 114 in the optical axis direction in accordance with a focusing signal "Fc" supplied from the servo circuit 138 (see FIG. 1). The tracking actuator 122 (irradiation position operating unit) operates the objective lens 114 along the radial direction of the optical disk 200 in accordance with a tracking signal "Tr" supplied from the servo circuit 138.

In this case, the tracking actuator 122 is mainly constituted by, for example, a coil to which the tracking signal Tr is applied, and a holding member which holds the objective lens 114, and is repelled/absorbed by this coil. As a consequence, an irradiation position of laser light emitted from the optical pick-up 100 is defined based upon a voltage of a tracking signal Tr which is applied to both ends of this coil.

It should be noted that a front monitor diode (not shown) is provided in the optical pick-up 100, and this front monitor diode receives such a laser light emitted from the laser diode 102 and thus supplies a current responding to a light amount of this received laser light to the laser power control circuit 162 shown in FIG. 1.

The stepping motor 140 (feeding unit) is arranged in such a manner that such an optical pick-up 100 is transported by rotating this stepped motor 140 along the radial direction with respect to the optical disk 200. The motor driver 142 supplies a drive signal to the stepping motor 140, and this drive signal is used to transport the optical pick-up 100 by a transport amount and along a transport direction instructed by the main control unit 170.

The RF amplifier 134 amplifies the light reception signal Rv derived from the optical pick-up 100, and supplies the amplified light reception signal to both the decoder 136 and the servo circuit 138. Since the light reception signal Rv obtained in the case that recorded information is reproduced has been EFM (Eight-to-Fourteen Modulation)-modulated, the decoder 136 EFM-demodulates this light reception signal to supply the EFM-demodulated light reception signal to the main control unit 170.

In this case, the main beam and the two sub-beams own such a positional relationship (not shown) in the optical pick-up 100. That is, when a spot center of the main beam is positioned at a groove center of the groove 202a (see FIG. 4), one of beam spots of the sub-beams is located on an inner side surface of this groove 202a, and the other of the beam spots of the sub-beams is located on an outer side surface. As a result, since a difference value between the received light intensity of these sub-beams is calculated, which is detected by the light reception element 108, it can be grasped that the main beam is positionally shifted to any one of the inner side/outer side with respect to the target groove 202a, and a shift amount can be grasped. As a consequence, when the information is recorded, the servo circuit 138 (irradiation position control unit) produces such a tracking signal Tr that the shift amount along the shift direction becomes zero and actuates the tracking actuator 122 based upon this tracking signal Tr, even when the optical disk 200 is rotated under eccentric condition, this servo circuit 138 can correctly trace the main beam with respect to the groove 202a (tracking control).

Such a control operation for transporting the optical pick-up 100 along the radial direction by rotating the stepping motor 140 is carried out by the main control unit 170 which issues an instruction in such a manner that, for example, the optical pick-up 100 is transported by 1 step to the outer side every time the optical disk 200 is rotated by a constant rotation number (thread control).

As previously explained, when the information is reproduced, or the information is recorded, positioning of the optical pick-up 100 with respect to the optical disk 200 is carried out by way of the thread control, and on the other hand, such an operation that the laser light emitted from the positioning-controlled optical pick-up 100 is traced to the groove 202a is carried out by the tracking control.

It should be noted that when the image is formed, the servo circuit 138 produces only the tracking signal Tr in response to an instruction issued from the main control unit 170 without executing the tracking control for tracing the groove 202a (will be discussed later).

Figure 3:
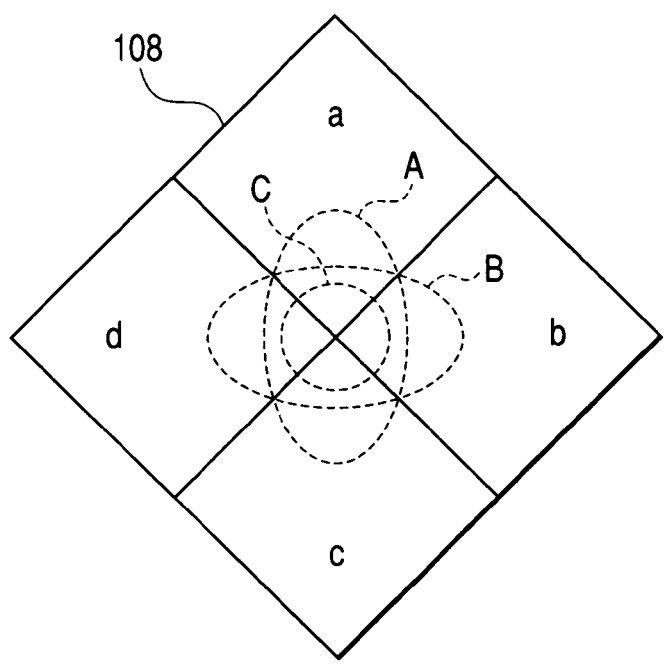
FIG. 3 is a plane view for indicating a structure of a light receiving element provided in the optical pick-up.

As indicated in FIG. 3, the detection area of the light receiving element 108 is actually sub-divided into four areas "a", "b", "c", and "e." On the other hand, an image of the main beam focused on the light receiving element 108 becomes a longitudinal ellipse "A" under such a condition that the objective lens 114 is located in the vicinity of the optical disk 200 by the cylindrical lens 115, and becomes a lateral ellipse "B" under such a condition that the objective lens 114 is located far from the optical disk 200 by the cylindrical lens 115, and becomes a circle "C" under such a condition that the objective lens 114 is just focused.

As a consequence, since (a+c)−(b+d) is calculated as to light receiving intensity obtained at the four areas, it can be grasped that the objective lens 114 is positionally shifted to the near side/far side with respect to the optical disk 200 and the shift amount of this objective lens 114. As a result, the servo circuit 138 produces such a focusing signal "Fc" by which this shift amount is reduced to zero, and even when the optical disk 200 is rotated in a waving manner by actuating the focus actuator 121, the servo circuit 138 can correctly make the spot diameter of the main beam constant (focusing control).

Next, the buffer memory 152 stores thereinto information which is supplied from the host computer via the interface 150, namely such an information (will be referred to as "recording data" hereinafter) which must be recorded on a recording plane of the optical disk 200 in the FIFO (First-In First-out) mode.

The encoder 154 EFM-modulates the recording data read out from the buffer memory 152, and then, outputs the EFM-modulated recording data to the strategy circuit 156. The strategy circuit 156 performs time axis correction processing operation and the like with respect to the EFM signal supplied from the encoder 154, and then, outputs the processed EFM signal to the laser driver 164.

On the other hand, the frame memory 158 stores thereinto information supplied from the host computer via the interface 150, namely, information (will be referred to as "image data" hereinafter) which should be formed on the optical disk 200.

Figure 5:
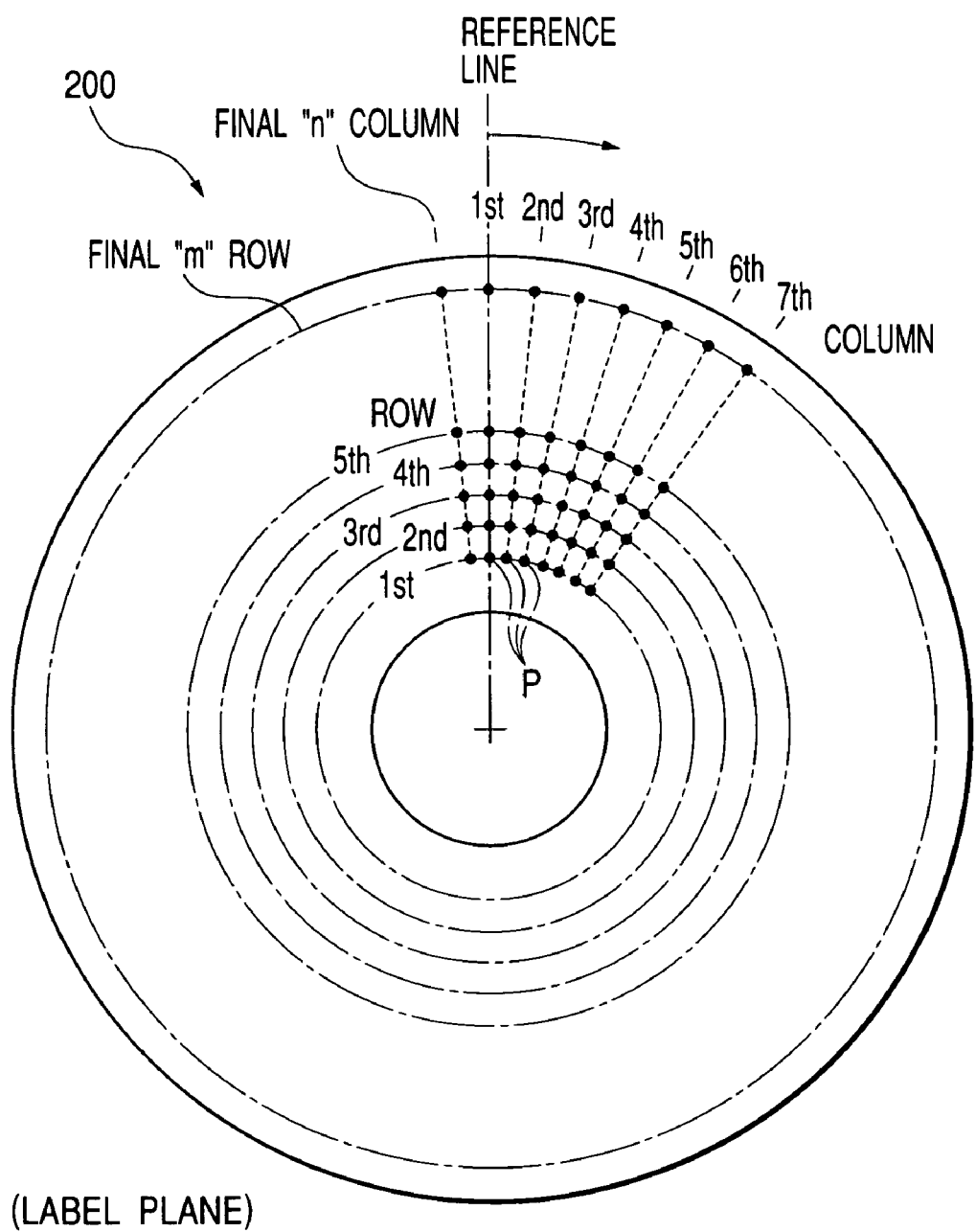
FIG. 5 is a diagram for explaining dots of an image which should be formed with respect to the optical disk.

This image data corresponds to a set of gradation data which defines density of dots "P" which should be drawn on the disk-shaped optical disk 200. As indicated in FIG. 5, as to the respective dots "P", these dots "P" are arrayed in correspondence with the respective cross points formed between coaxial circles and radial lines originated from a center of the optical disk 200. In this case, in order to explain a cross-point coordinate system in the optical disk 200, for the sake of convenience, the coaxial circles are sequentially defined as a first row, a second row, a third row, - - -, an m-th row (final row) from the inner circumferential side to an outer circumferential side, whereas when one certain radial line is used as a reference line, other radial lines are sequentially defined as a first column, a second column, a third column, - - -, an n-th column (final column) along the clockwise direction.

Figure 6:
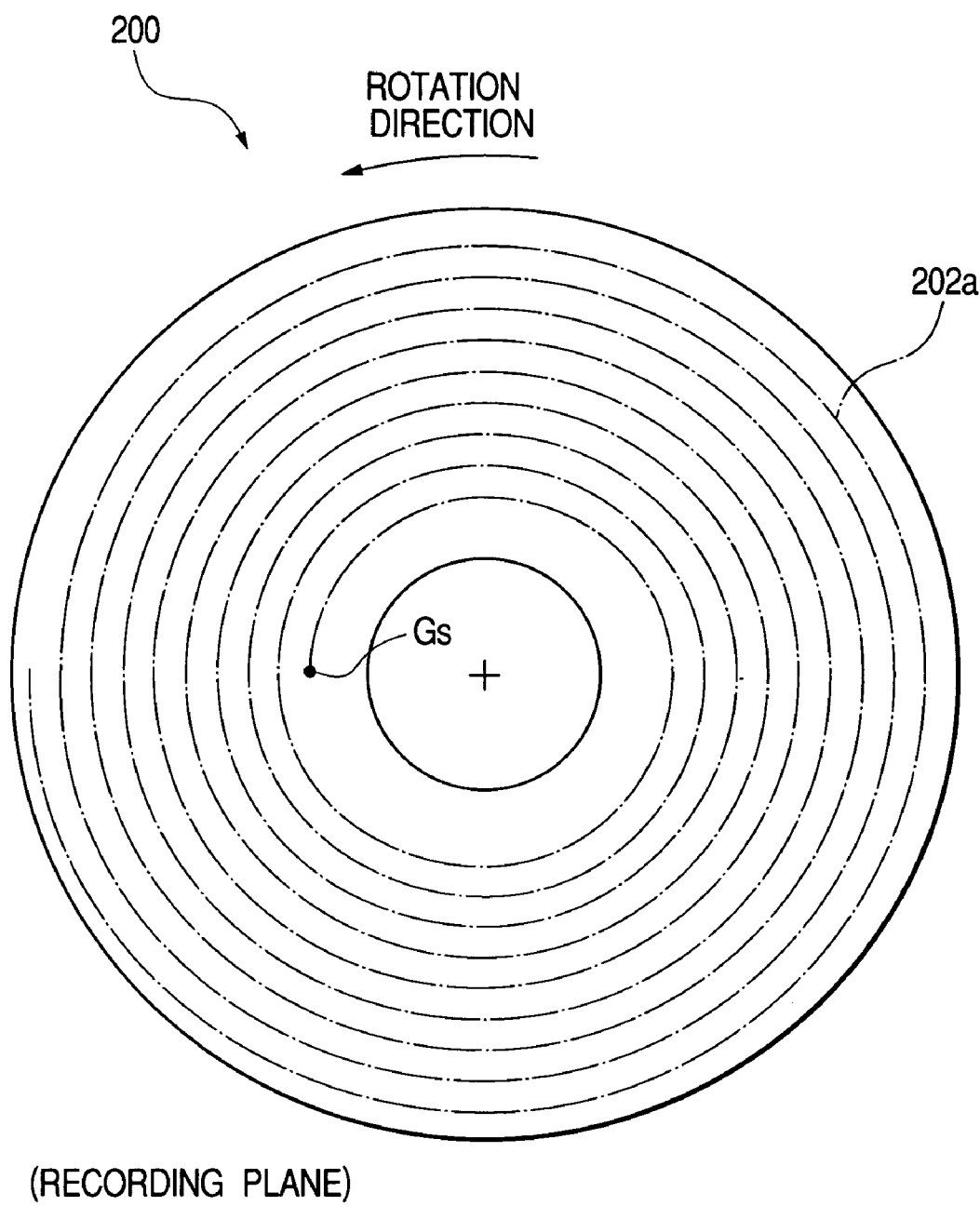
FIG. 6 is a diagram for explaining grooves of the optical disk, as viewed from a recording plane thereof.

In this case, the reason why the arrangement of these dots is defined for the sake of convenience is given as follows:

In general, as shown in FIG. 6, when the groove 202a of the optical disk 200 is viewed from the recording plane, this groove 202a owns such a spiral shape from the inner circumferential side along the clockwise direction. When the information is recorded on this recording plane, since this groove 202a must be traced from an edge point "Gs" of the inner circumferential side of the groove 202a in view of the specification, the optical disk 200 is rotated along the counter-clockwise direction as viewed from the recording plane, and on the other hand, the optical pick-up 100 is transported from the inner circumferential side toward the outer circumferential side of this optical disk 200.

In this embodiment, while the above-explained structure is employed as the initial condition, when the optical disk 200 is rotated under such a condition that the label plane thereof is set to be located opposite to the optical pick-up 100, the optical pick-up 100 is scanned in the main scanning direction by this disk rotation, and on the other hand, the optical pick-up 100 is moved from the inner circumferential side to the outer circumferential side in the sub-scanning direction, so that the image is formed.

As a result, with respect to the relative movement of the optical pick-up 100 with respect to the optical disk 200, as shown in FIG. 5, when the optical disk 200 is fixed and is viewed from the label plane, the main scanning direction with respect to the optical disk 200 becomes the counter-clockwise direction which is reversed from the rotation direction.

When the array of these dots are defined as explained above, gradation data are stored in the frame memory 158 in correspondence with the array of m rows×n columns as represented in FIG. 7. In this case, in accordance with this embodiment, it is so assumed that while the gradation data is 3 bits, an image of 8 ($=2^3$) gradation per 1 dot is formed. Precisely speaking, it is so assumed that among the 3-bit gradation data, the gradation data of (000) defines the brightest (lightest) density, whereas a plurality of density data defined from (001), (010), (011), (100), (101), (110) up to (111) in this order instruct forming of dots having dark (deep) density.

With respect to the image data stored in the frame memory 158, when a specific row is designated by the main control unit 170, the gradation data of this specific row (one row) are read out in a batch mode so as to be employed for judgment operations in the main control unit 170. On the other hand, when both a row and a column are designated by the main control unit 170, the gradation data for only one dot located in this row and this column is read, and then, the read gradation data is supplied to the data converter 160.

It should be understood that FIG. 5 merely schematically illustrates the positional relationship among these dots "P." However, in an actual case, these dots "P" are arrayed in a fine manner. This fine array may be similarly applied to pitches of the groove 202a indicated in FIG. 6.

Generally speaking, an image data employed in a host computer is formed in a bit map format. As a consequence, in the case that an image is formed on the optical disk 200, the image data formed in the bit map format may be converted by the host computer and the like into such a coordinate system as shown in FIG. 5, and the converted data may be stored into the frame memory 158 in such a storage manner as shown in FIG. 7.

A detailed structure of the main control unit 170 is not shown in the drawing. This main control unit 170 is constituted by a CPU (Central Processing Unit), a ROM (Read-Only Memory), a RAM (Random Access Memory), and the like. The main control unit 170 controls the information recording operation with respect to the recording plane of the optical disk 200, and the image forming operation with respect to the label plane of the optical disk 200 by operating the respective units of the image forming apparatus 10 in proper manners in accordance with a program previously stored in the ROM.

<Irradiation Locus of Laser Light>

On the other hand, when the label plane is irradiated with the laser light, the condition of the returned laser light when the image is formed is different from the condition of the returned laser light when the information is formed. There are many possibilities that stable and correct tracking control operations cannot be expected. As a consequence, in this embodiment, in such a case that the label plane is irradiated with the laser light so as to form the image, the image forming apparatus of this embodiment is arranged in such a manner that the irradiation position of the laser light with respect to the optical disk 200 is controlled without employing the tracking control for tracing the groove 202a.

It should be understood that although this image forming apparatus does not imply that the tracking control operation is not carried out when the image is formed, such a tracking control operation may be combined with the irradiation position control when the image is formed (will be explained in below-mentioned application/modification).

In such a case that the rotation direction of the optical disk 200 is assumed as the main scanning direction and the radial direction thereof is assumed as the sub-scanning direction when the image is formed, such a means for sub-scanning the irradiation position of the laser light by a necessary amount along the radial direction without employing the tracking control operation corresponds only to such an arrangement capable of moving the optical pick-up 100 by rotating the stepping motor 140.

In this case, assuming now that minimum transport resolution of the optical pick-up 100 achieved by the stepping motor 140 is on the order of 10 μm, a minimum pitch of a formed image along the sub-scanning direction becomes equal to this minimum transport resolution, namely on the order of 10 μm.

As a consequence, if the focusing control operation is carried out in such a manner that the spot diameter of the laser light with respect to the heat-sensitive layer 205 becomes equal to the resolution, namely on the order of 10 μm, and the intensity of the laser light is defined in response to the dot of the image to be formed, then such an idea that the formed image can be made better may be accepted at a glance.

However, in such a case that the laser diode 102 whose spot diameter has been designed to be on the order of 1 μm when the information is recorded is employed by enlarging this spot diameter of approximately 1 μm to such a spot diameter of approximately 10 μm when the image is formed, irradiation intensity per unit area with respect to the heat-sensitive layer 205 is lowered, so that discoloration cannot be satisfactorily carried out.

To the contrary, in such an arrangement that the heat-sensitive layer 205 is simply irradiated with the laser light having the spot diameter of on the order of 1 μm, and the optical pick-up 100 is sub-scanned in the radial direction by such a length of approximately 10 μm corresponding to the minimum transport resolution every time the optical disk 200 is rotated by 1 turn, a portion which is actually discolored within 1 dot is merely such a line-shaped portion having a width of approximately 1 μm, which is irradiated with the laser light having the spot diameter of 1 μm. The remaining 90% portions of 1 dot is left under non-discoloration, since this laser light is not irradiated. As a result, an occurrence of the following problem may be conceived. That is, a ratio of a discolored portion to a not-discolored portion within such a dot having the lightest density is 0%, whereas a ratio of a discolored portion to a not-discolored portion within such a dot having the deepest density is merely approximately 10%. Therefore, since a difference between these radios is very small, a contrast ratio of formed images would be considerably lowered, and the visibility thereof would be deteriorated.

To this end, in this embodiment, firstly, when dots for 1 row are formed, the optical disk 200 is rotated (circulated) plural times under such a condition that the optical pick-up 100 remains fixed. It should be understood that since the irradiation loci of the laser light with respect to the optical disk 200 is identical to each other over the plural rotations, in the embodiment, secondly, such tracking signals "Tr" are applied every time the optical disk 200 is rotated. The tracking signals "tr" are set in such a way that the irradiation loci is different from each other every disk rotation, while the frequencies of the tracking signals "Tr" are identical to each other, the amplitudes of the tracking signals "Tr" are identical to each other, and only the phases of the tracking signals "Tr" are different from each other. Precisely speaking, in this embodiment, in view of such a relationship that an image having 8 gradation is formed, when the optical disk 200 is rotated 7 times and pass timing of a reference line is set to zero on the time axis in order to form the dots for 1 row, the main control unit 170 instructs the servo circuit 138 to produce such triangle-waveform signals as the tracking signals "Tr." That is, as to these triangle-waveform signals, a phase of a triangle-waveform signal is set to zero at a first rotation time, and thereafter, phases of triangle-waveform signals are sequentially delayed by (2π/7) at a second rotation time and succeeding rotation times.

Figure 8A:
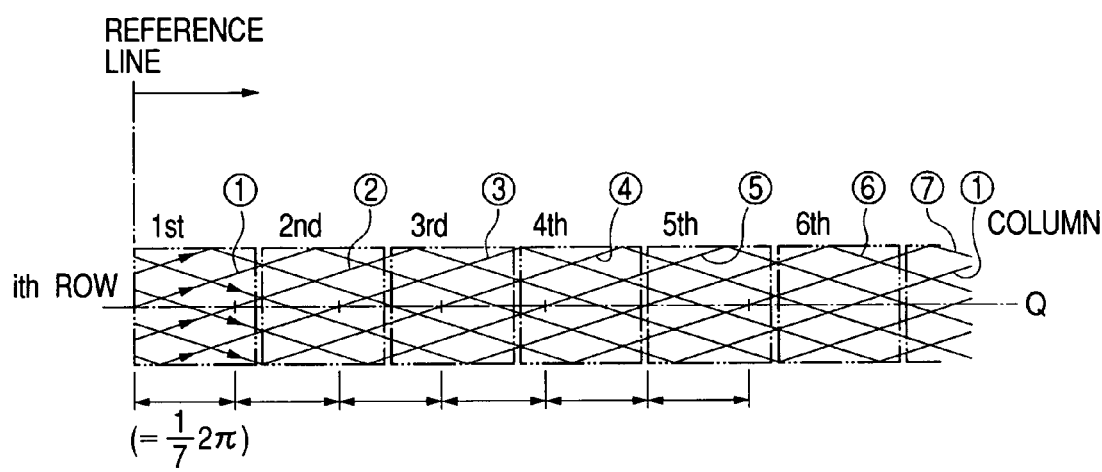
FIG. 8A and FIG. 8B are diagrams for explaining irradiation loci of laser light, respectively.

When such tracking signals "Tr" are supplied to the tracking actuator 122, as illustrated in FIG. 8A, the irradiation loci of the laser light with respect to the optical disk 200 is made different from each other over the loci defined from a locus (1) at the first rotation time up to a locus (7) at the seventh rotation time.

It should be noted that in FIG. 8A, symbol "Q" represents such an irradiation locus of laser light formed in an assumption that the voltage of the tracking signal "Tr" is set to zero in such a case that the optical pick-up 100 is located at such a point corresponding to a certain 1 row among dot arrays of an image to be formed. Although the irradiation loci of the laser light is actually an arc, this irradiation loci is expanded in a straight-line form in this drawing, for the sake of easy explanations.

<Gradation Display>

As previously explained, when the dots for 1 row are formed, since the irradiation loci of the laser light is different from each other every rotation of the optical disk 200, if such a control operation is carried out in such a way that the heat-sensitive layer 205 is discolored by irradiating with the laser light the optical disk 200 at a certain rotation time, whereas the heat-sensitive layer 205 is not discolored at another rotation time, then an area ratio of a discolored portion to a non-discolored portion in a certain dot is changed, so that an indication of dark/light gradation can be made.

Precisely speaking, in this embodiment, the optical disk 200 is irradiated with the laser only certain times equal to rotation times corresponding to a decimal value of the gradation data of the 7 rotation times so as to discolor the heat-sensitive layer 205, while the 7 rotation times are required in order to form the dots for 1 row. For example, when the gradation data corresponds to (101), the optical disk 200 is irradiated with such a laser light having intensity capable of discoloring the heat-sensitive layer 205 only 5 times of the 7 rotation times, so that the relevant locus portion is discolored. When the gradation data corresponds to (011), the optical disk 200 is irradiated with such a laser light having intensity capable of discoloring the heat-sensitive layer 205 only 3 times among the 7 rotation times, so that the relevant locus portion is discolored.

A major arrangement for defining the intensity of the laser light every rotation over 7 rotation times required for forming the dots for 1 row is the data converter 160 (laser light intensity defining unit). In other words, when the data converter 160 is operated in the contrast priority mode, as indicated in FIG. 9, this data converter 160 converts the gradation data read out from the frame memory 158 into any one of ON data (bit) and OFF data in response to the rotation time designated by the main control unit 170. This ON data sets the intensity of the laser light to a write level, whereas the OFF data sets the intensity of the laser light to a servo level. For example, in the case that the gradation data read out from the frame memory 158 is (010), the data converter 160 converts this read gradation data into the ON data at the time of the first rotation time and the second rotation time, then the data converter 160 converts this read gradation data into the OFF data at the time of the third rotation time to the seventh rotation time.

In this case, the above-explained "write level" corresponds to such a value that the laser light has certain intensity to discolor the heat-sensitive layer 205 when irradiating it, whereas the above-described "servo level" corresponds to such a value that the laser light has certain intensity which does not substantially discolors the heat-sensitive layer 205 when irradiating it. The reason why the laser light having the intensity of the servo level is outputted although the heat-sensitive layer 205 is not substantially discolored is given as follows. That is, as will be explained later, the focusing control operation (and light amount control operation) is carried out.

When the data converter 160 is operated in a time-saving mode (will be explained later), if the gradation data read out from the frame memory 158 corresponds to any gradation data other than (000), then the data converter 160 converts all this gradation data into the ON data. On the other hand, only when the gradation data readout from the frame memory 158 corresponds to (000), the data converter 160 converts all this gradation data into the OFF data.

<Image Forming Mode>

In accordance with this method, when the dots for 1 row are formed, the optical disk 200 must be rotated at least 7 times. On the other hand, in the case that an image to be formed is constructed only from such characters as symbols, characters, and numerals, forming of such an image having multi-gradation and a high contrast ratio is not always required. It is expected to form such a scene which is indicated by merely two (ON/OFF) gradation modes, and expected to form such a scene that a user wishes to shorten a time duration required to form an image rather than a gradation display.

To this end, in this embodiment, two modes are prepared, namely a contrast priority mode in which forming of an image having a high contrast ratio is performed with a top priority, and a time-saving mode in which shortening of time required to form an image is carried out with a top priority. The image forming apparatus 10 employs such an arrangement that an image is formed in any one of the above-explained two modes.

It should be noted that as to setting of such a mode, various sorts of arrangements can be conceived. That is, (1) the host computer instructs mode setting operation to the main control unit 170 via the interface 150; (2) the main control unit 170 analyzes the gradation data stored in the frame memory 158 so as to form a histogram, and then, and judges the proper mode based upon this formed histogram; and (3) the user sets the proper mode via a separately provided selection unit.

Referring back to descriptions of FIG. 1, the laser power control circuit 162 is employed so as to control intensity of laser light which is emitted from the laser diode 102 (see FIG. 2). Concretely speaking, the laser power control circuit 162 controls a current value of a drive signal "Li" in such a manner that an emission light amount of the laser diode 102 detected by the front monitor diode is made coincident with a target value of optimum laser power supplied by the main control unit 170.

In this case, as previously explained, since the image forming apparatus 10 of this embodiment employs the CAV system, namely the constant angular velocity system, the further the optical pick-up 100 is directed toward the outer circumference of the optical disk 200, the higher the linear velocity of this optical disk 200 is increased. As a result, the main control unit 170 sets that the further the optical pick-up 100 is located on the outer side of the optical disk 200, the higher the target value of the light level is increased.

The laser driver 164 produces such a drive signal "Li" to which the control content has been reflected by the laser power control circuit 20 in accordance with the modulation data supplied from the storage circuit 156, and then, supplies this produced drive signal Li to the laser diode 102 of the optical pick-up 100 when the information is recorded. Further, the laser driver 164 produces such a drive signal "Li" to which the control content has been reflected by the laser power control circuit 20 in accordance with the data converted by the data converter 160, and then, supplies this produced drive signal Li to the laser diode 102 of the optical pick-up 100 when the image is formed.

As a consequence, the intensity of the laser beam omitted from the laser diode 102 is feedback-controlled in such a manner that this intensity will be made coincident with the target value supplied from the main control unit 170.

<Detections of Reference Line and Column>

As explained above, the rotation detector 132 outputs the signal FG having the frequency in correspondence with the spindle rotation speed. The PLL circuit 144 is synchronized with the signal "FG" and produces clock signal "Dck" and then supplies this produced clock signal "Dck" to the main control unit 170. This clock signal Dck has a frequency which is defined by multiplexing the frequency of the signal FG. The frequency dividing circuit 146 produces a reference signal SFG which is obtained by frequency-dividing the signal FG by a constant number, and then, supplies the reference signal SFG to the main control unit 170.

Figure 10:
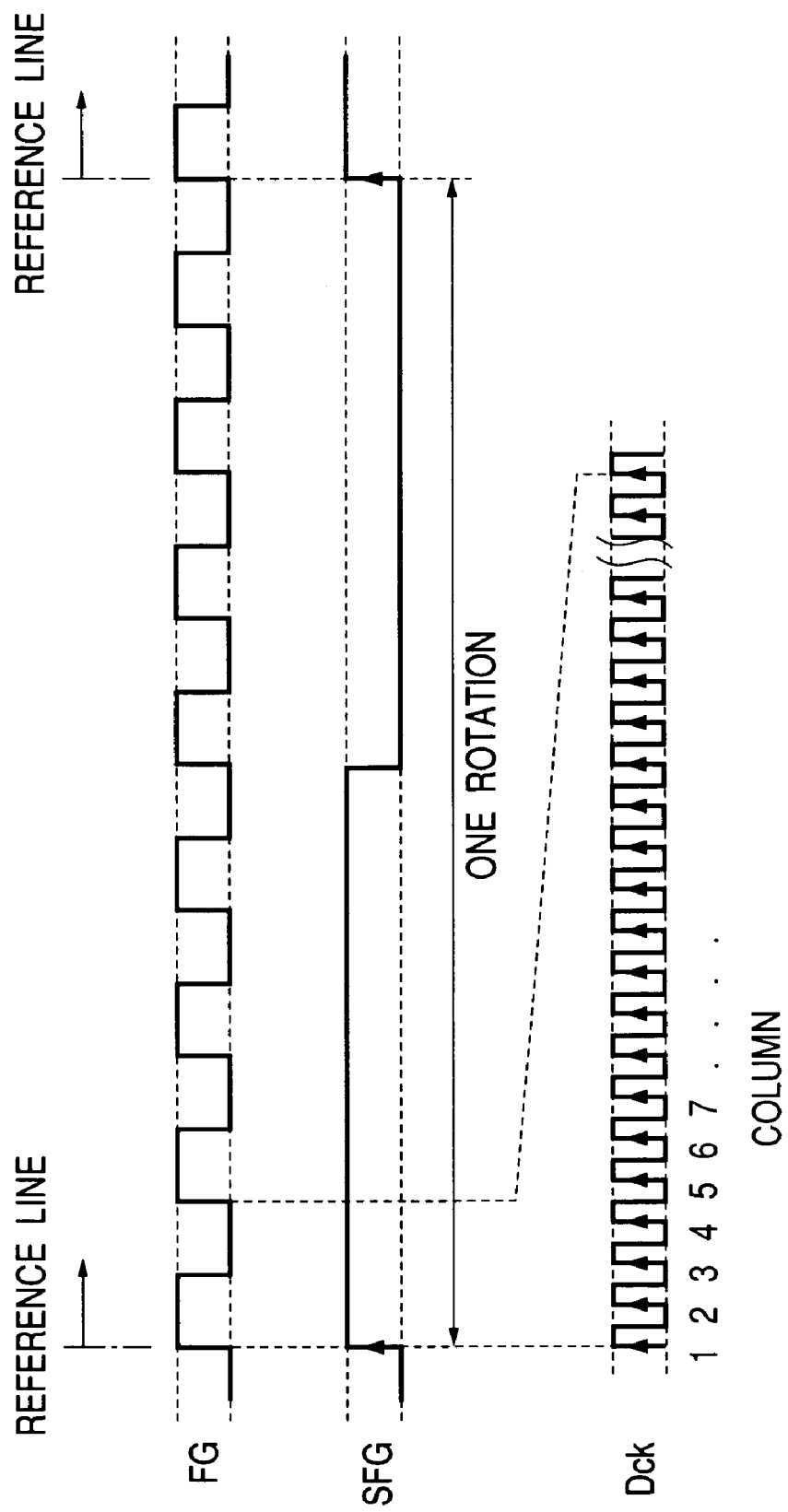
FIG. 10 is a timing chart for explaining both a detection of a reference line and a detection of a dot column in the optical disk.

In this case, assuming now that the rotation detector 132 produces 8 pieces of pulses (see FIG. 10) as the signal FG within a time period during which the spindle motor 130 is rotated by 1 turn, namely the optical disk 200 is rotated by 1 turn, the frequency dividing circuit 146 frequency-divides the signal FG by ⅛ to produce the frequency-divided signal as the reference signal SFG. As a consequence, the main control unit 170 detects that rising timing of the reference signal SFG is such a timing at which the irradiation position of the laser light by the optical pick-up 100 has passed through the reference line of the optical disk 200.

In this case, when a multiplication ratio of a frequency in the PLL circuit 144 is set to be equal to such a value obtained by dividing a column number "n" per 1 row by 8, 1 time period of the clock signal Dck is made coincident with such a time period during which the optical disk 200 is rotated by an angle for 1 column of the dot array.

As a consequence, since the main control unit 170 sequentially counts the rising timing of the clock signal Dck after the reference signal SFG has risen, this main control unit 170 detects how many columns are present after the laser light irradiation position of the optical pick-up 100 has passed the reference line of the optical disk 200 when the image is formed.

It should be understood that such an expression as to "the reference line of the optical disk 200" should be described as follows: Correctly speaking, it implies a reference line with respect to the rotation shaft of the spindle motor 130. Either when the information is recorded, or when the image is formed, since the optical disk 200 is rotated under such a condition that this optical disk 200 is chucked to a table which is directly coupled to this rotation shaft, the reference line with respect to the rotation shaft of the spindle motor 130 keeps a constant positional relationship with respect to one certain radial line within the optical disk 200. As a consequence, as long as this condition is maintained, there is no problem that one radial line within the optical disk 200 is called as the reference line of the optical disk 200.

In this embodiment, while the rising timing of the reference signal is defined as the reference line passing timing of the optical disk 200, the rising timing of the clock signal Dck is used as such a timing at which the optical disk 200 is rotated only by such an angle for 1 column of the dot array. Apparently, falling timing may be alternatively employed in any cases.

<Operations of Image Forming Apparatus 10>

Next, a description will now be made of operations of the image forming apparatus 10 according to this embodiment. This image forming apparatus 10 owns such a master feature that an image is formed on the optical disk 200. On the other hand, in addition to the master feature, the image forming apparatus 10 owns such a slave feature of commonly available function constructed of the conventional information recording function and this image forming function. Accordingly, operations when the information recording function is executed are simply explained, and thereafter, the image forming operations corresponding to this major feature will be explained in detail.

<Information Recording Operations>

First, in the case that information is recorded on the recording plane of the optical disk 200, as explained above, after the optical disk 200 has been set in such a manner that the recording plane thereof is positioned so as to face to the optical pick-up 100, the spindle motor 130 is controlled in the feedback manner by the servo circuit 138 in such a manner that the angular velocity instructed by the main control unit 170 is achieved. On the other hand, the optical pick-up 100 is fed by rotating the stepping motor 140 up to a point corresponding to the innermost circumference of the groove 202a.

Then, when the tracing operation of the groove 202a is commenced by the tracking control operation, the data which have been recorded in the buffer memory 152 are read out in accordance with the recorded orders, and the read data are EFM-modulated by the encoder 154, and thereafter, the EFM-modulated data are processed by way of the time axis correction process operation and the like by the strategy circuit 156. Then, the control operation by the main control unit 170 is carried out in such a manner that the intensity of the laser light is properly switched to either the write level or the servo level in accordance with the EFM-modulated data, and this intensity is made coincident with the target value designated by the main control unit 170. Since the recording layer 202 irradiated with the laser light at the write level is altered, the information is recorded on this recording layer 202.

It should be noted that when the information is recorded, the above-explained thread control operation and focusing control operation are carried out in addition to the rotation control operation, the tracking control operation, and the light amount control operation.

<Image Forming Operation>

Figure 11:
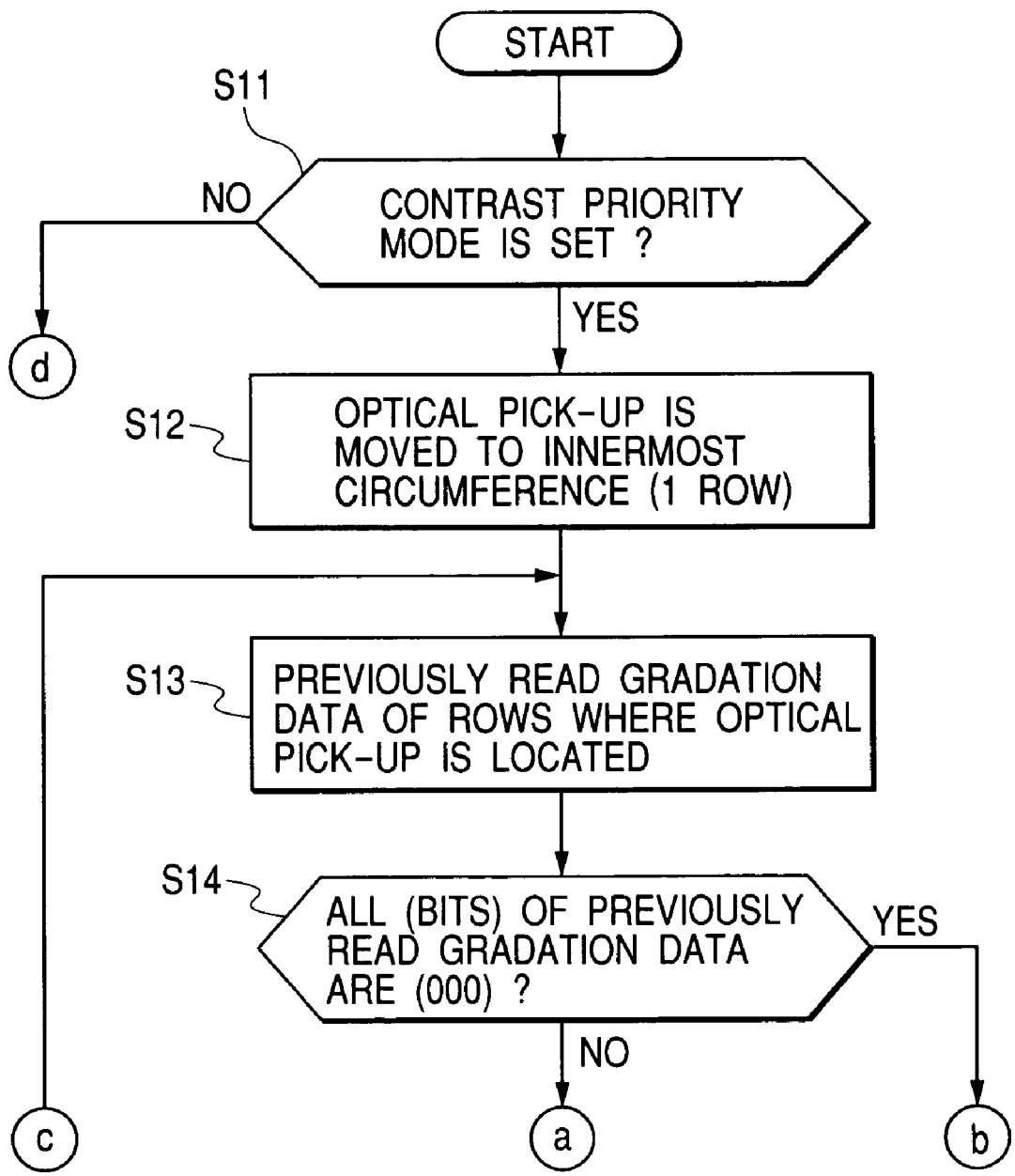
FIG. 11 is a flow chart for describing an image forming operation executed by the optical disk image forming apparatus.
Figure 12:
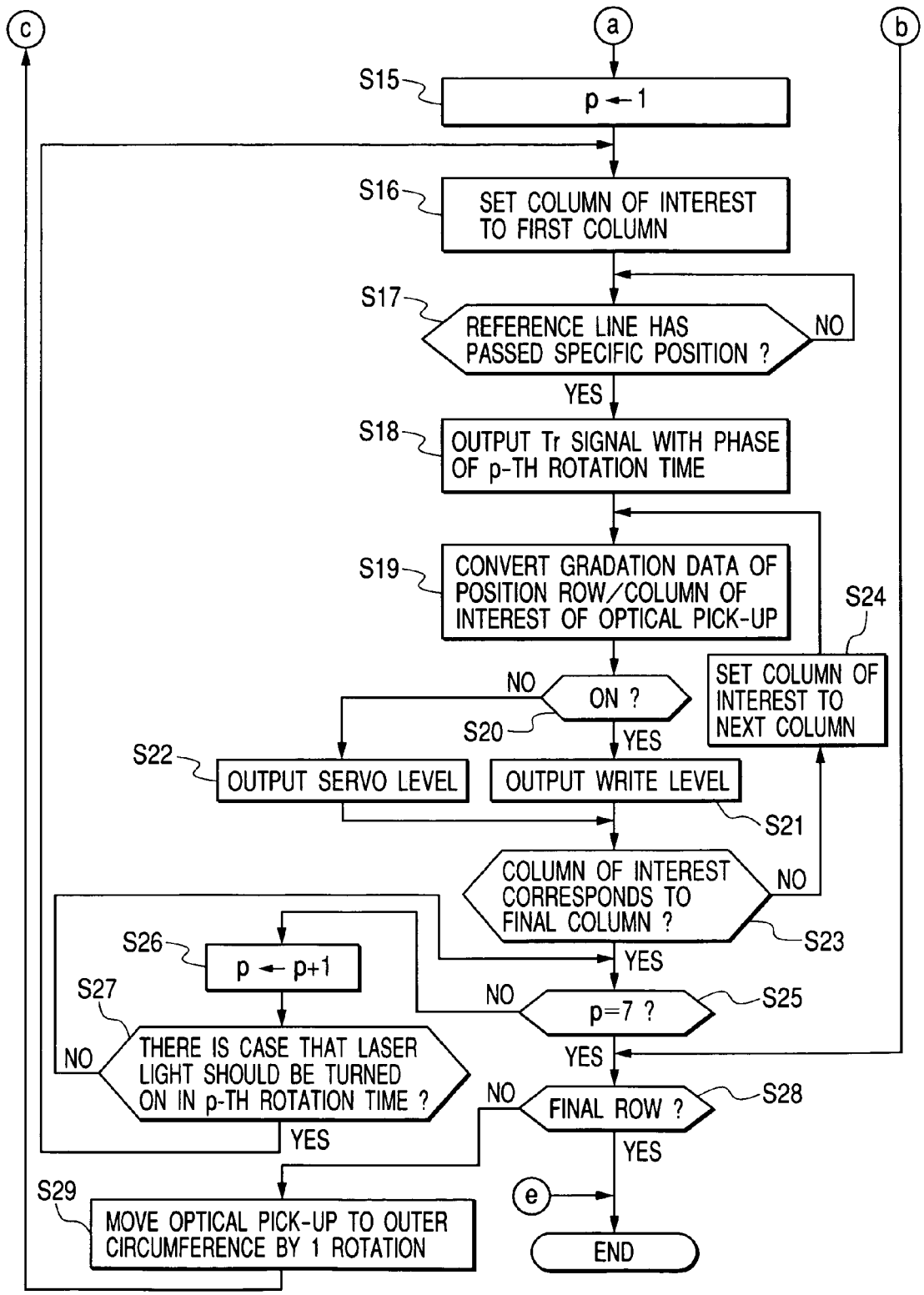
FIG. 12 is a flow chart for describing an image forming operation executed by the optical disk image forming apparatus.
Figure 13:
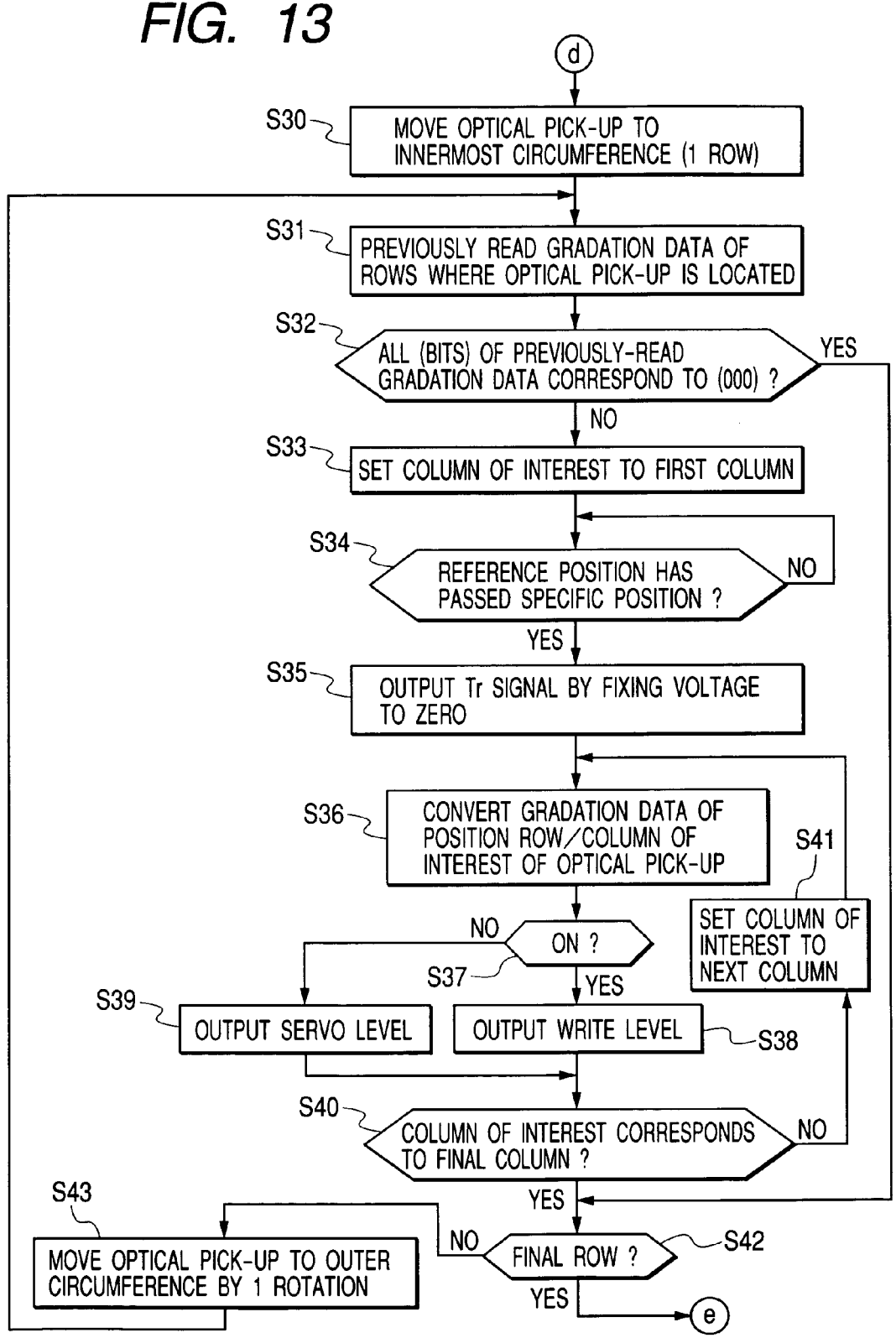
FIG. 13 is a flow chart for describing an image forming operation executed by the optical disk image forming apparatus.

Next, a description will now be made of an image forming operation with respect to the optical disk 200 executed by the image forming apparatus 10. FIG. 11, FIG. 12, and FIG. 13 are flow charts for explaining this image forming operation.

It should be understood that such an assumption is made. That is, when an image is formed, as explained above, the optical disk 200 is set in such a manner that the label plane of this optical disk 200 is located so as to face to the optical pick-up 100. The image data indicative of the image to be formed has been supplied from the host computer to the image forming apparatus 10, and has been stored in the frame memory 158. When the image is formed, the focusing control operation, the light amount control operation, and the rotation control operation are continuously executed with respect to the optical disk 200. However, as previously described, the tracking control operation for tracing the groove 202a is not carried out.

<Contrast Priority Mode>

First, the main control unit 170 judges as to whether or not the operation mode has been set to the contrast priority mode before the image is actually formed (step S11). When this judgment result is "YES", the main control unit 170 outputs such a command that the optical pick-up 100 is moved to a point corresponding to the innermost circumference (namely, first row) of the optical disk 200 (step S12). In response to this command, the motor driver 142 produces such a signal required to move the optical pick-up 100 to this point, and then, the stepping motor 140 is rotated based upon this signal, so that the optical pick-up 100 is actually moved to this point.

Next, the main control unit 170 previously reads gradation data for 1 (one) row of the rows where the optical pick-up 100 is located among the image data stored in the frame memory 158 (step S13). It should be noted that when the process operation defined in the step S13 is executed in a first time, all of the gradation data of the first row corresponding to the innermost circumference of the optical disk 200 are read out in advance.

Then, the main control unit (first judging unit) 170 judges as to whether or not all of the gradation data for 1 (one) row which have been read in advance are equal to (000) (step S14). Such a condition that all of the gradation data for the 1 row are equal to (000) implies such a fact that the heat-sensitive layer 205 need not be at all discolored over 7 rotations of the optical disk 200 which are required to form dots of this row.

As a consequence, in the case that this judgment result is YES, the main control unit 170 skips the process sequence operation to a step S28 (will be explained later) without stopping in order to omit a process operation required for forming "n" pieces of dots which constitute this row.

On the other hand, when this judgment result is NO, the main control unit 170 sets "1" to a variable "p" (step S15). In this case, the variable "p" is employed in order to grasp that which rotation is selected from the 7 rotations of the optical disk 200 which are required to form the dots of the rows where the optical pick-up 100 is positioned. As a consequence, since "1" is set to the variable "p", the main control unit 170 grasps that the first rotation is selected.

Subsequently, the main control unit 170 pays an attention to a first column so as to sequentially process gradation data as to columns defined from the first column up to the final "n" column among the rows where the optical pick-up 100 is located (step S16). Then, the main control unit 170 is brought into a waiting state until the reference line of the rotating optical disk 200 has passed a specific position, namely until the rising timing of the reference signal SFG is reached (step S17).

In this case, when the reference signal SFG rises, the main control unit 170 instructs the servo circuit 138 to output the tracking signal Tr in such a phase corresponding to the rotation number indicated by the variable "p" (step S18). As a result, since the servo circuit 138 commences to output the tracking signal Tr in the phase corresponding to the circumference number indicated by the variable "p", the optical beam emitted from the optical pick-up 100 starts to be vibrate along the radial direction of the optical disk 200, while this optical beam actually traces such loci corresponding to the variable "p" from the locus (1) to the locus (7) as indicated in FIG. 8A. For example, when the variable "p" is "1", the optical beam traces the locus (1) with respect to the optical disk 200.

A series of process operations defined from a step S19 up to a step S24 is executed in synchronism with 1 time period of the clock signal Dck while such a tracking signal Tr is produced in parallel thereto.

In other words, the main control unit 170 reads out from the frame memory 158, such gradation data corresponding to the column of interest as to the rows where the optical pick-up 100 is positioned at the present time. Otherwise, the main control unit 170 may alternatively output such gradation data corresponding to the dots which correspond to the relevant row/column among the previously-read gradation data for 1 row. As a consequence, the data converter 160 converts the read gradation data into either the ON data or the OFF data in correspondence with the rotation number indicated by the variable "p" (step S19). This ON data causes the intensity of the laser light to become the write level, whereas the OFF data causes the intensity of the laser light to become the servo level.

The laser driver 164 judges the converted data (step S20), and then outputs such a drive signal "Li" corresponding to the write level only in such a case that this converted data is the ON data (step S21). As a result of such a fact that the laser diode 102 employed in the optical pick-up 100 emits the laser light in the write level, in the heat-sensitive layer 205 of the optical disk 200, only such a locus portion corresponding to the rotation number indicated by the variable "p" is discolored among the dots which correspond to the column of interest at the present time and the rows located opposite to the optical pick-up 100.

On the other hand, in the case that the converted data is the OFF data, or in such a case that the converted data is not supplied, namely data is not the ON data, the laser driver 164 outputs the drive signal "Li" corresponding to the servo level (step S22). As a result, since the laser diode 102 employed in the optical pick-up 100 emits the laser light in the servo level, the heat-sensitive layer 205 is not disclosed.

Thereafter, the main control unit 170 judges as to whether or not the column of interest corresponds to the final "n" column (step S23). When the judgment result becomes NO, this judgment control unit 170 advances the column of interest to a next column (step S24). Then, a similar process operation is repeatedly carried out by the main control unit 170 with respect to the column of interest after the process operation has been advanced. As a consequence, since this repetition process operation is carried out in correspondence with the column until the final "n" column, the laser light is applied to the loci of the rotation number corresponding to the variable "p" in the rows where the optical pick-up 100 is located.

As previously explained, since one cycle of this repetition process operation is executed in synchronism with 1 time period of the clock signal Dck, the laser light is applied in response to either the ON data or the OFF data which has been converted in correspondence with this row and this rotation number every time the optical disk 200 is rotated by such an angle corresponding to 1 dot from the reference line.

On the other hand, in the case that the main control unit 170 judges that the column of interest is the final "n" column, this main control unit 170 further judges as to whether or not the variable "p" corresponds to "7" at the present time (step S25). When this judgment result is NO, the main control unit 170 increments the variable "p" by "1" (step S26), and then waits for the next rotation of the optical disk 200.

The main control unit (second judging unit) 170 again investigates the previously-read gradation data for 1 row in order to judge as to whether or not there is such a case that the laser light should be applied in the write level in the rotation which is indicated by the incremented variable "p" (step S27).

For example, under such a condition that the variable "p" after being incremented is equal to, for example, "4", when all of the gradation data for 1 row are smaller than, or equal to (011), as shown in FIG. 9, the main control unit 170 judges that there is no such a case that the laser light should be applied in the write level in the fourth rotation. When the gradation data for 1 dot larger than, or equal to (100), the main control unit 170 judges that there is such a case that the laser light should be applied in the write level in this fourth rotation.

In the case that the judgment result in the step S27 is NO, the process sequence option is again returned to the step S25, the main control unit 170 judges as to whether or not the variable "p" after being incremented is equal to "7". In such a case that the converted contents obtained by the data converter 160 are such contents as shown in FIG. 9 as in this embodiment, when the variable "p" in a certain row is a value "α" (value "α" is integer capable of satisfying 2≦α<7), if the judgment result of the step S27 once becomes NO, then this judgment result continuously becomes NO until the variable "p" subsequently becomes "7".

On the other hand, in the case that the judgment result in the step S27 becomes YES, the process sequence operation is again returned to the step S16. As a result, the process operations defined from the step S16 up to the step S25 are carried out in correspondence with the rotation indicated by the variable "p" after being incremented.

Either in the case that the main control unit 170 judges that the variable "p" is "7" in the step S25, or in the case that the judgment result of the step S14 becomes YES, the main control unit 170 judges as to whether or not a row where the optical pick-up 100 is located corresponds to the final "m" row (step S28). When this judgment result becomes NO, the main control unit 170 outputs such a command by which the optical pick-up 100 is moved to a point on the side of the outer circumference of the optical disk 200 by such a distance equal to 1 row of this optical disk 200, namely is transported by the minimum transport resolution of the optical pick-up 100 by the stepping motor 140 (step S29). In response to this command, the motor driver 142 produces a signal required to move the optical pick-up 100 up to this point, and then, the stepping motor 140 is rotated in response to this signal. As a result, the optical pick-up 100 is actually transported to this point. Thereafter, the process sequence operation is again returned to the step S13. Accordingly, the process operations defined from the step S13 to the step S28 are carried out in correspondence with such a row after the optical pick-up 100 has been moved.

On the other hand, in the case that the main control unit 170 judges that the row where the optical pick-up 100 is located corresponds to the final "m" row, this judgment case implies such a fact that the image forming operations for the first row up to the final "m" row have been accomplished for the optical disk 200 set to this image forming apparatus 10. As a consequence, the main control unit 170 accomplishes this image forming operation, and executes an eject process operation (not shown) for ejecting this optical disk 200, for instance, if required.

As previously explained, in this embodiment, the image forming operation for 1 row (1 rotation) with respect to the optical disk 200 is carried out in the contrast priority mode by way of the overwriting operation 7 times in which the irradiation loci of the laser light is made different from each other. Then, of these 7 times of the overwriting operations, the image forming operations are carried out in such a manner that the darker the intensity designated by the gradation data becomes, the larger the times of the overwriting operations are increased.

In this case, in this embodiment, the main control unit 170 investigates gradation data for 1 row before the overwriting operation of this 1 row is performed. If all of the gradation data for this 1 row are equal to (000), then the optical pick-up 100 is immediately moved to the outer side by 1 row without actually rotating the optical disk 200 seven times. In other words, if the laser light of the write level need not be applied even 1 time within the 7 rotation times required to form the image for this 1 row, then the optical pick-up 100 is immediately transported to the outer side by 1 row without actually rotating the optical disk 200 seven times. Precisely speaking, when the judgment result in the step S14 is YES, the process sequence operation is skipped to a step S28. Further, when the judgment result of the step S28 is NO, a process operation defined in a step S29 is executed. As a result, since the process operation executed on such a row that the image forming operation is not performed (namely, heat-sensitive layer 205 is not discolored) is skipped, a total time required to execute the image forming operation can be shortened by such a time required for this skipped process operation.

Furthermore, in the contrast priority mode, in the second rotation and the succeeding rotations except for the first rotation of the 7 rotations of the optical disk 200, which are required to form the image for 1 row, the main control unit 170 previously judges as to whether or not there is such a case that the laser light of the write level should be applied in the relevant rotation. When this judgment result become NO, the rotations subsequent to this relevant circuit are skipped. In other words, if the judgment result of the step S27 becomes No, then the process sequence operation is returned not to the step S26, but returned to the step S25. In addition, similar to this embodiment, in such a case that the converted contents obtained in the data converter 160 are indicated in FIG. 9, if the judgment result of the step S27 once becomes NO, then this judgment result continuously becomes NO until the variable "p" becomes "7."

For instance, under such a condition that the variable "p" is equal to "4" in a certain row, when all of the gradation data in this certain row are small than, or equal to (011), if the judgment result in the step S27 becomes NO, subsequently, the judgment result made in the step S27 continuously becomes NO until the variable "p" is incremented to become "7." As a result, the optical pick-up 100 is moved by 1 row to the outer side of the optical disk 200 from the fourth rotation up to the seventh rotation without executing the process operations defined from the step S16 up to the step S24.

As a consequence, since the process operation for such a rotation that the image forming operation is not carried out in the optical disk 200 is skipped (rotation skip), the time required to execute the image processing operation is furthermore shortened in combination with the above-described skipped process operation with respect to the row.

The reason why the first rotation is excluded from the rotation skipping subject among the 7 rotations required to form the image for 1 row is given as follows: That is, if the first rotation is skipped, the judgment result of the step S14 becomes YES, so that this condition implies such a fact that this first row is skipped.

<Time-Saving Mode>

Next, a description will now be made of operations executed in the case that the judgment result in the step S11 is "NO", namely, in such a case that the image forming mode is set to the time-saving mode. In this time-saving mode, an image forming operation for 1 row (1 rotation) with respect to the optical disk 200 is carried out by rotating this optical disk 200 only 1 time (1 turn). As a result, in the time-saving mode, the process operation related to the variable "p" is not present in the below-mentioned explanations, and the image forming operation by way of the overwriting operation cannot be carried out. As a consequence, in the time-saving mode explained in this case, only such a binary representation as "ON" and "OFF" is limitedly made. It should be noted that since gradation data itself is 3 bits, in this embodiment, when the gradation data corresponds to any bits other than (000), the heat-sensitive layer 205 is irradiated with laser light having a write level so as to discolor this heat-sensitive layer 205, whereas when the gradation data corresponds to (000), the heat-sensitive layer 205 is irradiated laser light having a servo level in order that this heat-sensitive layer 205 remains undiscolored.

In the case that the image forming mode is set to the time-saving mode, the main control unit 170 outputs such a command by which the optical pick-up 100 is moved to a point corresponding to the innermost circumference (first row) of the optical disk 200 (step S30). Similar to the above-explained contrast priority mode, the optical pick-up 100 is moved to this point in response to this command.

Next, similar to the contrast priority mode, the main control unit 170 previously reads only gradation data for 1 row (one row) of the rows where the optical pick-up 100 is located from the image data stored in the frame memory 158 (step S31). Then, the main control unit (first judging unit) 170 judges as to whether or not all bits of the gradation data for 1 row (one row) which have been read in advance are equal to (000) (step S32). Such a condition that all bits of the gradation data for the 1 row are equal to (000) implies such a fact that the heat-sensitive layer 205 need not be at all discolored over 1 rotation time of the optical disk 200, which are required to form dots of this row. As a consequence, in the case that this judgment result is "YES", the main control unit 170 skips the process sequence operation to a step S42 (will be explained later) without stopping in order to omit a process operation required for forming "n" pieces of dots which constitute this row.

On the other hand, when this judgment result is "NO", the main control unit 170 pays an attention to a first column so as to sequentially process gradation data as to columns defined from the first column up to the final "n" column of the rows where the optical pick-up 100 is located (step S33). Then, the main control unit 170 is brought into a waiting state until the reference line of the rotating optical disk 200 has passed a specific position, namely until the rising timing of the reference signal SFG appears (step S34).

In this case, when the reference signal SFG rises, the main control unit 170 instructs the servo circuit 138 to set the voltage of the tracking signal Tr to become zero (step S25). As a result, since the servo circuit 138 fixes the voltage of the tracking signal Tr to zero and then outputs this tracking signal Tr having the zero voltage, a locus of an optical laser beam produced by the optical pick-up 100 is not vibrated along the radial direction of the optical disk 200, and become such a circular shape (namely, locus "Q" shown in FIG. 8A) which is obtained by simply main-scanning the rotated optical disk 200.

A series of process operations defined from a step S36 up to a step S41 is executed in synchronism with 1 time period of the clock signal Dck. In other words, the main control unit 170 reads out from the frame memory 158, such gradation data corresponding to a column of interest as to the rows where the optical pick-up 100 is positioned at the present time. On the other hand, if this read gradation data corresponds to (000), then the data converter 160 converts this read gradation data into such an OFF data which sets the intensity of the laser light to the servo level, whereas if this read gradation data corresponds to any bits other than "000", then the data converter 160 converts this read gradation data into such an ON data which sets the intensity of the laser light to the write level (step S36).

The laser driver 164 judges the converted data (step S37), and then outputs such a drive signal "Li" corresponding to the write level only in such a case that this converted data is the ON data (step S38). As a result of the fact that the laser diode 102 employed in the optical pick-up 100 emits the laser light in the write level, in the heat-sensitive layer 205 of the optical disk 200, only a part of a locus portion which is opposed to the optical pick-up 100 and corresponds to the dots of the column of interest at the present time is discolored.

On the other hand, either in the case that the converted data is the OFF data, or in the case that the converted data is not supplied, namely is not the ON data, the laser driver 164 outputs the drive signal "Li" corresponding to the servo level (step S39). As a result, since the laser diode 102 employed in the optical pick-up 100 emits the laser light in the servo level, the heat-sensitive layer 205 is not disclosed.

Thereafter, the main control unit 170 judges as to whether or not the column of interest corresponds to the final "n" column (step S40). When the judgment result becomes NO, this judgment control unit 170 advances the column of interest to a next column (step S41). Then, a similar process operation is repeatedly carried out by the main control unit 170 with respect to the column of interest after the process operation has been advanced. As a consequence, since this repetition process operation is carried out in correspondence with the respective columns until the final "n" column is reached, the optical disk 200 is irradiated with the laser light in accordance with either the converted ON data or the converted OFF data in the rows where the optical pick-up 100 is located.

As previously explained, since one cycle of this repetition process operation is executed in synchronism with 1 time period of the clock signal Dck, the laser light is applied in response to either the ON data or the OFF data every time the optical disk 200 is rotated by such an angle corresponding to 1 dot from the reference line.

On the other hand, in the case that the main control unit 170 judges that the column of interest is the final "n" column, or in such a case that the judgment result of the step S32 becomes YES, the main control unit 170 furthermore judges as to whether or not a row where the optical pick-up 100 is located corresponds to the final "m" row (step S42). When this judgment result becomes NO, the main control unit 170 outputs such a command by which the optical pick-up 100 is moved to a point on the side of the outer circumference of the optical disk 200 by such a distance equal to 1 row of this optical disk 200 (step S43). In response to this command, the optical pick-up 100 is actually transported to this point. Thereafter, the process sequence operation is again returned to the step S31. Accordingly, the process operations defined from the step S31 to the step S42 are carried out in correspondence with such a row after the optical pick-up 100 has been moved.

On the other hand, in the case that the main control unit 170 judges that the row where the optical pick-up 100 is located corresponds to the final "m" row, this judgment case implies such a fact that the image forming operations for the first row up to the final "m" row have been accomplished with respect to the optical disk 200 set to this image forming apparatus 10.

In the time-saving mode, as previously described, since the image forming operation for the 1 row (1 rotation time) with respect to the optical disk 200 is carried out by way of the simple single writing operation, although the resulting contrast of the formed image is deteriorated as compared with that of the contrast priority mode, a total time required to form the image can be considerably shortened.

In this case, in this embodiment, the main control unit 170 investigates gradation data for 1 row before the single writing operation of this 1 row is performed. If all bits of the gradation data for this 1 row are equal to (000), then the optical pick-up 100 is immediately moved to the outer side by 1 row. Precisely speaking, when the judgment result in the step S32 is YES, the process sequence operation is skipped to a step S42. When the judgment result of the step S42 is NO, a process operation defined in a step S43 is executed. As a result, similar to the contrast priority mode, since the process operation executed with respect to such a row that the image forming operation is not performed (namely, heat-sensitive layer 205 is not discolored) in the optical disk 200 is skipped, a total time required to execute the image forming operation can be shortened by such a time required for this skipped process operation.

<Concrete Example of Formed Images>

Next, the images formed by this image forming apparatus 10 will now be explained with reference to a concrete example.

First, in the case that the image forming mode is set to the contrast priority mode, dots in each of the rows are represented by executing the overwriting operations plural times indicated by a decimal value of gradation data thereof. Precisely speaking, within the heat-sensitive layer 205 of the optical disk 200, the laser light having the write level is applied to such an area corresponding to the dots plural times indicated by such a decimal value representative of the gradation data of these dots along loci different from each other every rotation time of the optical disk 200. As a result, the larger a total irradiation time of the write level is increased, the larger the ratio of the discoloration area to the dot area is essentially increased.

Figure 15:
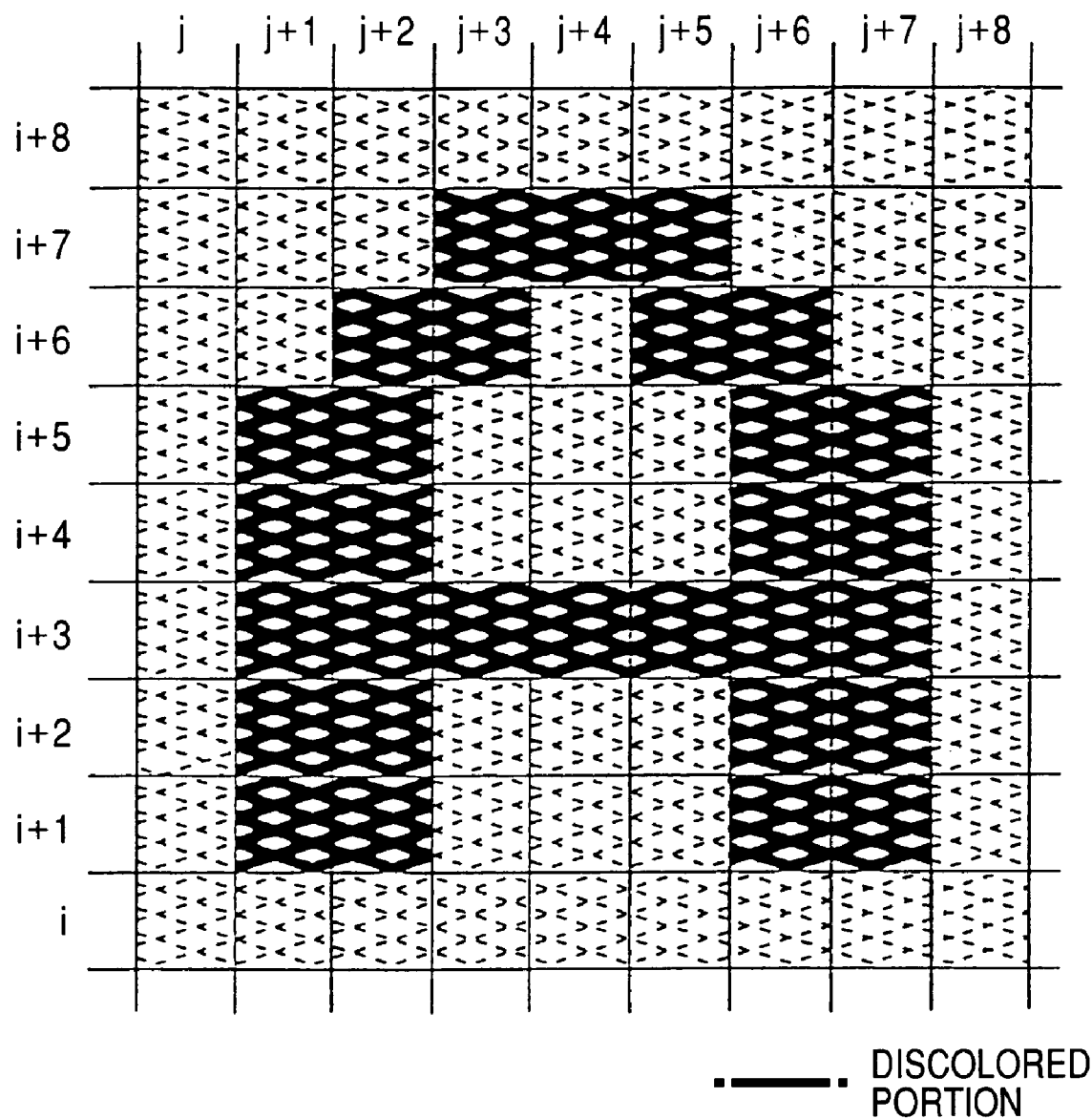
FIG. 15 is a diagram for explaining an image formed in correspondence with the storage contents.

In this case, when such gradation data which constitute an initial condition of forming an image are stored into the frame memory 158 as represented in FIG. 14, an image which is formed in accordance with the contrast priority mode is indicated as those of FIG. 15. In other words, in the contrast priority mode, as to such dots whose gradation data (bits) correspond to (111), since the laser light having the write level is applied along the loci different from each other every time the optical disk 200 is rotated from the first rotation time up to the seventh rotation time, a ratio of an area of portions discolored by this laser irradiation to an area of these dots becomes maximum.

Figure 18:
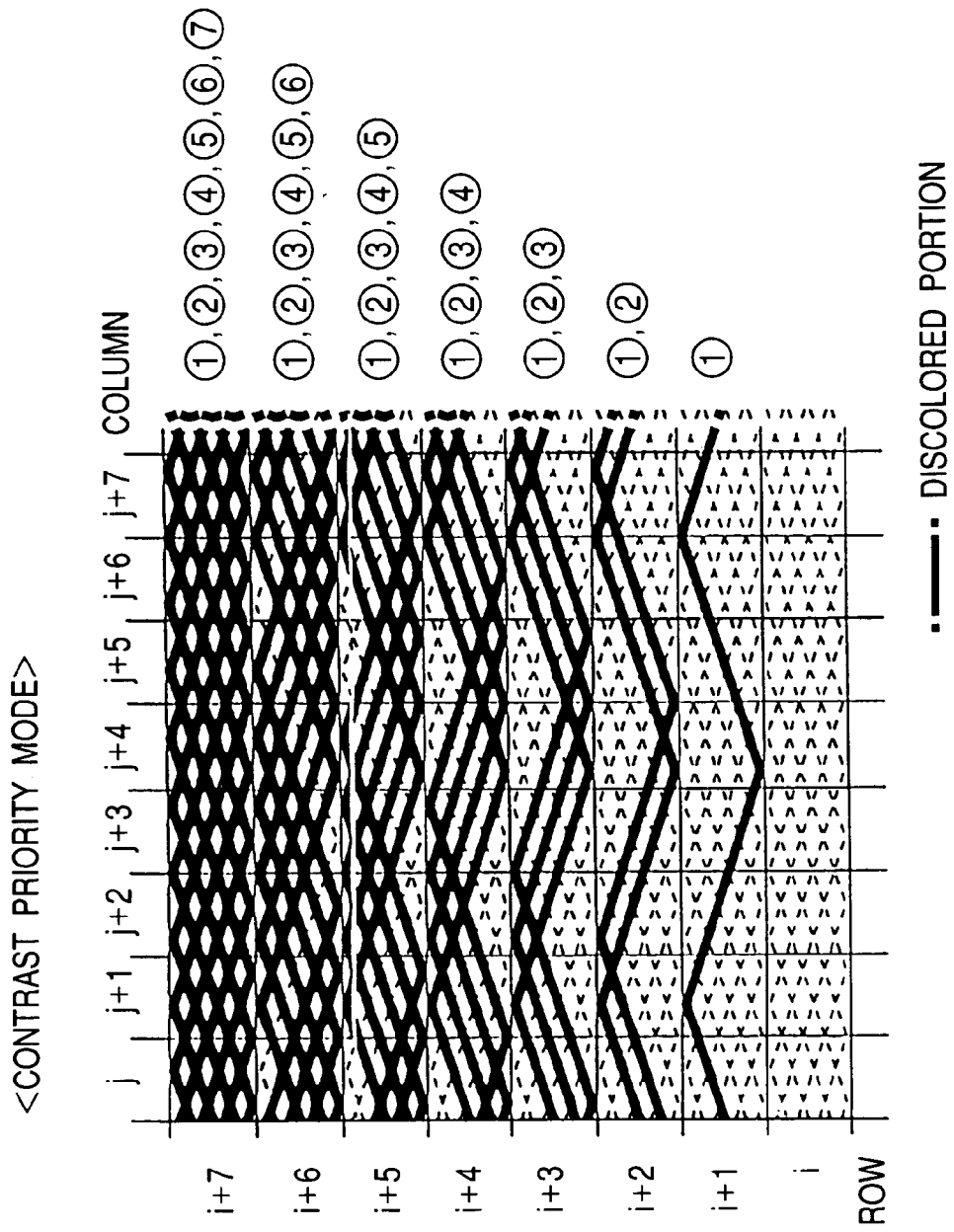
FIG. 18 is a diagram for explaining an image formed in correspondence with the storage contents.

When storage contents of the frame memory 158 are those as shown in FIG. 17, an image which is formed in accordance with the contrast priority mode is indicated as those of FIG. 18. In other words, in the contrast priority mode, as to such dots whose gradation data (bits) correspond to (000), a total time during which the laser light having the write level is irradiated is equal to zero. However, while the values (bits) of the gradation data are increased under such a state of (001), (010), (011), - - - , (111), total times during which the laser light having the write level is applied are increased under such a state of 1 time, 2 times, 3 times, - - - , 7 times. As a result, since a ratio of areas which are discolored by being irradiated with this laser to the area of the dots is gradually increased in accordance with these gradation data, such an image having 8 gradation corresponding to the respective 3-bit gradation data is eventually formed.

Figure 16:
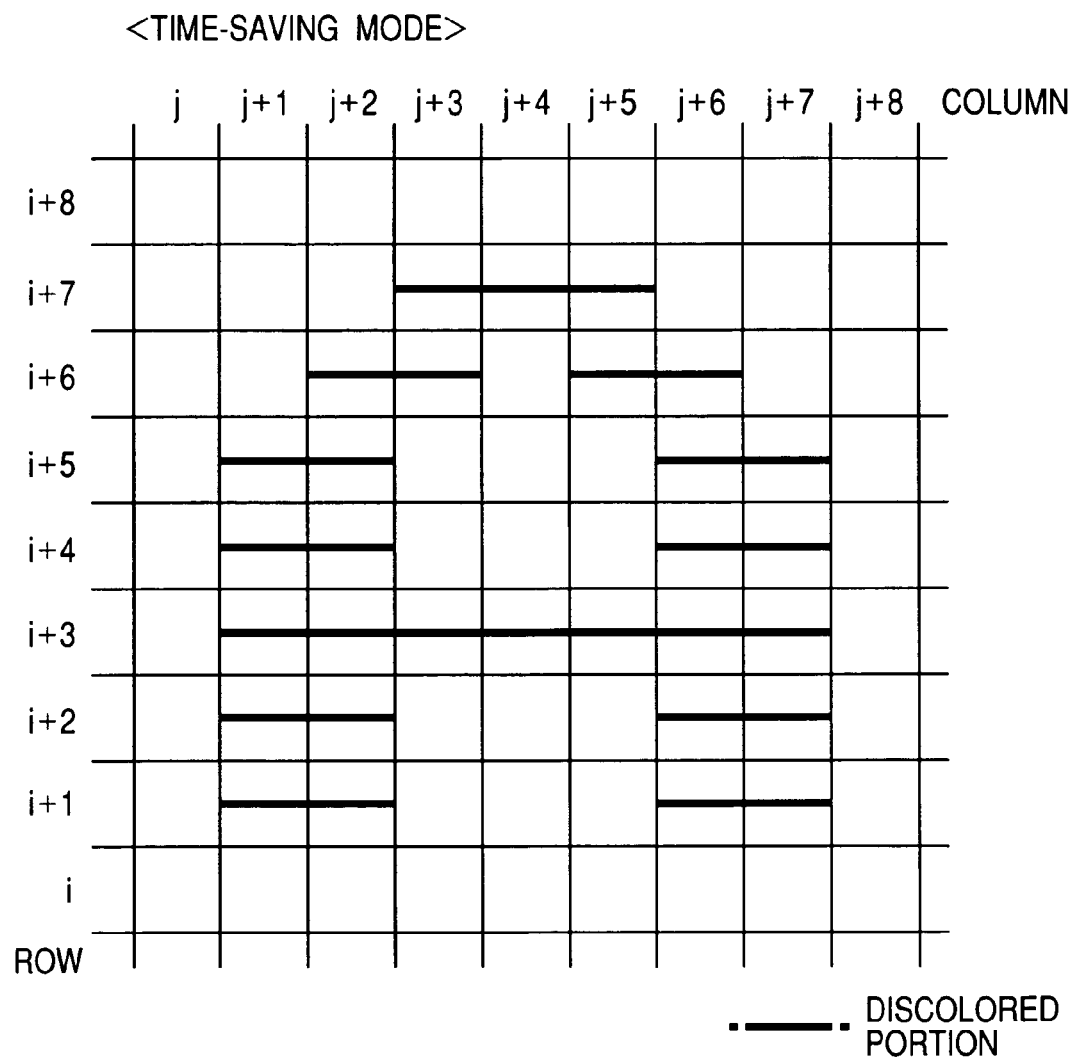
FIG. 16 is a diagram for explaining an image formed in correspondence with the storage contents.

On the other hand, in such a case that the image forming mode is set to the time-saving mode, dots in each of the rows are represented by being irradiated with the laser light having the write level only 1 time as to such gradation data other than (000) in this embodiment. In this case, when such gradation data as shown in FIG. 14 are stored in the frame memory 158, such an image which is formed in accordance with the time-saving mode is obtained as an image as shown in FIG. 16. In other words, as to the gradation data other than the dots of (000), in the time-saving mode, since these gradation data are merely represented by the discoloration caused by applying the laser light having the write level by 1 time, a contrast ratio of formed images is lowered, as compared with that of the contrast priority mode.

It should be noted that in the time-saving mode, a total time required to form an image of 1 row is finished only by such a time during which the optical disk 200 is rotated by 1 turn. As a result, in comparison with the contrast priority mode, in such a case that at least one dot, or more dots are present as to the gradation data of (111) in each of the rows, the total time required to form the image can be shortened by approximately ½.

As previously explained, in this embodiment, when an image having a high contrast ratio is wanted to be formed, the image forming mode can be set to the contrast priority mode, whereas when an image is wanted to be formed within a short time, the image forming mode can be set to the time-saving mode. As a consequence, while the image forming mode can be properly selected from the contrast priority mode and the time-saving mode in response to various sorts of conditions such as tastes of the users and image qualities, the proper images can be formed on the optical disk 200.

It should be noted that in FIG. 14 to FIG. 18, symbol "i" shows such a symbol capable of explaining each of the rows from the 1st row up to the "m"-th row in a generic indication manner. Symbol "j" indicates such a symbol capable of explaining each of the columns from the 1st column up to the "n"-th column in a generic indication manner (these symbols are similarly used in FIG. 20, will be explained later).

<Applications/Modifications>

It should be understood that the present invention is not limited only to the above-described embodiments, but can be realized in the form of the below-mentioned applications/modifications.

<Recording Layer is Employed as Discoloration Layer>

In the above-described embodiment, the image forming apparatus 10 is arranged in such a manner that the heat-sensitive layer 205 is irradiated with the laser light so as to form the image on this heat-sensitive layer 205. Alternatively, since the recording layer 202 employed when the information is recorded is discolored by way of the laser light, this recording layer 202 is employed as the discoloration layer in accordance with the present invention. If the recording layer 202 is employed as the discoloration layer as explained above, then recording data is recorded on the recording plane, and thereafter, this data recording operation is immediately advanced to the image forming operation without turning over the optical disk 200.

It should be understood that in the case that the recording layer 202 is employed as the discoloration layer, the image cannot be formed while the innermost side of the optical disk 200 is used as a starting point. This reason is very clear. That is to say, it is because the recording data is written from the innermost side while the edge point "Gs" of the groove 202a is used as the starting point when the information is recorded on the optical disk 200. In other words, both an area used to form the image and another area employed to record the information cannot be employed in the overlapping manner.

As a consequence, in the case that the recording layer 202 is employed as the discoloration layer, after the below-mentioned measures (1) and (2) are taken, other limitations should be made in connection with an amount of data recorded on the recording layer 202 (namely, area used to record thereon information), for instance, such an area employed to form an image therein is limited. In the measure (1), after the recording data has been recorded from the inner circumferential side of the optical disk 200, the above-explained image forming operation is executed, while such a point is employed as a starting row, and this point is separated from a write end point of this recording data by such a distance over which no adverse influence is given to reading operation of this recording data. In the measure (2), while the outermost circumference of the optical disk 200 is used as a starting row, the image is formed toward the inner circumference side of the optical disk 200 within such a range where no adverse influence is given to the recorded recording data.

<Prevention of Polarization of Discoloration Portion>

In the above-described embodiment, the image forming apparatus 10 is arranged by that when the image forming mode is set to the contrast priority mode, the gradation data is converted into either the ON data or the OFF data in response to the rotation time in such a manner that the converted data are continued as to the adjoining rotations by employing the conversion table as shown in FIG. 9. As a result, if all of gradation data larger than, or equal to a certain value are not present over the entire 1 row in a certain rotation, then the irradiation of the laser light is skipped in this rotation and the succeeding rotations, so that the total time required to form the image can be shorted by the time required to skip this irradiation of the laser light.

However, in the above-explained arrangement, the irradiation loci of the laser light with the write level is located adjacent to each other. For example, in the case that the gradation data (bits) is (100), as shown in FIG. 18, the laser light applied in the write level traces the loci (1), (2), (3), (4) corresponding to the respective rotations defined from the first rotation up to the fourth rotation, and the loci is located adjacent to each other along the row direction and the column direction. As a consequence, even when the same gradation data are employed, two cases may happen to occur. Namely, in one case, portions which are discolored by applying thereto the laser light are concentrated at the upper portion of the dots. In the other case, portions which are discolored by applying thereto the laser light are concentrated at the lower portion of the dots, depending upon the column. There are some possibilities that this is visibly recognized as a difference in representations.

For example, as to dots of (i+4)-th row/(j+2)-th column, and dots of (i+4)-th row/(j+5)-th column, although any of gradation data are (100) (see FIG. 17), the discolored portions are concentrated to the upper portion of the dots in the former case, whereas the discolored portions are concentrated to the lower portion of the dots in the latter case (see FIG. 18).

As an application example in order to solve such a polarization of these discolored portions, contents converted by the data converter 160 may be defined in such a manner that the irradiation loci of the laser light with the write levels is arranged in an essentially equi-interval from the first rotation up to the seventh rotation.

Figure 20:
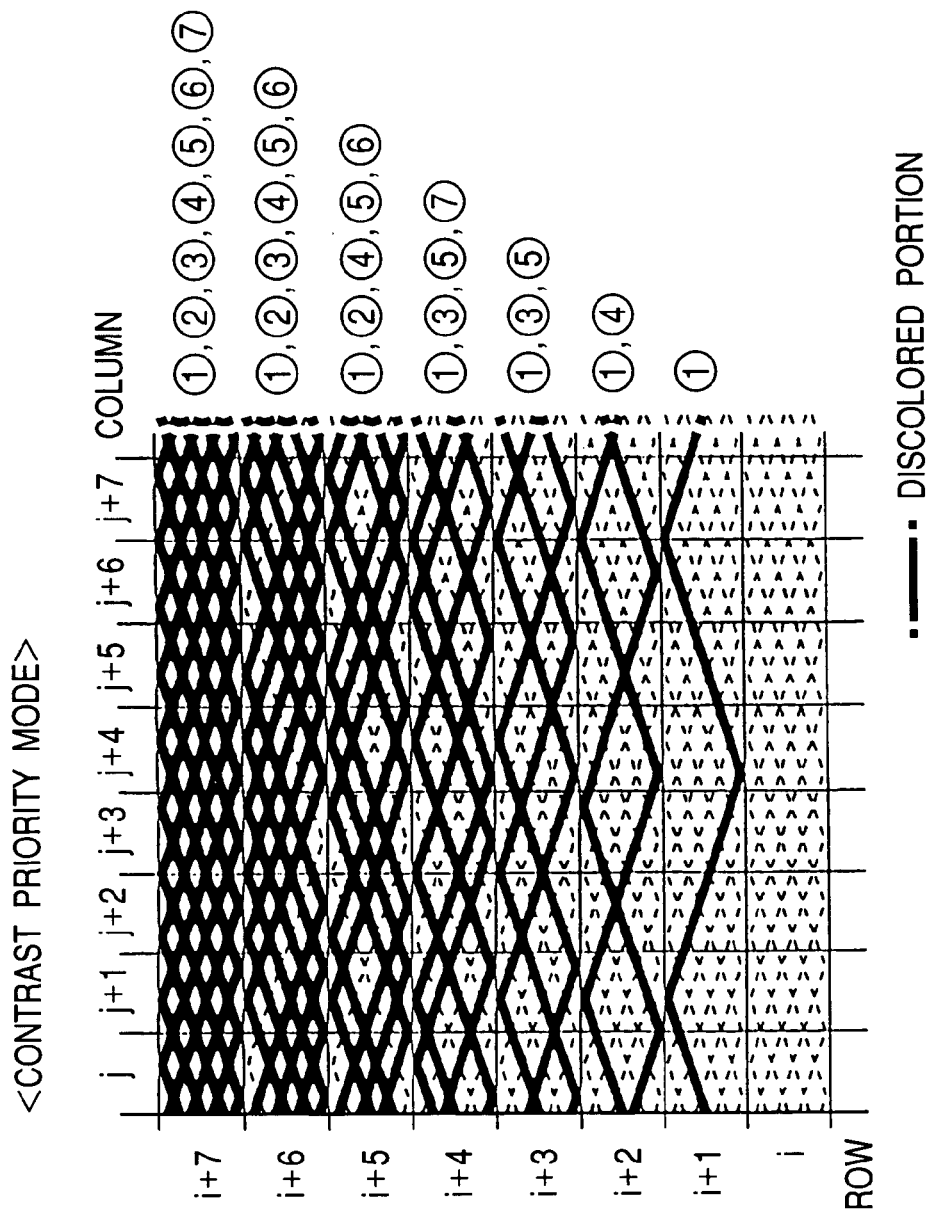
FIG. 20 is a diagram for explaining an example of an image in the application example.

Concretely speaking, as represented in FIG. 19, the converted contents by the data converter 160 are made as such converted contents that as to one certain gradation data, either the ON data or the OFF data are arranged in an essentially equi-interval in the respective rotations. In the case that such converted contents are employed, when the gradation data are stored in the frame memory 158 in such a manner as shown in FIG. 17, an image which is formed in the contrast priority mode is obtained as shown in FIG. 20, so that the polarization of these discolored portions is more or less suppressed.

As the measures capable of solving the polarization of the discolored portions as explained above, either a shift amount of a phase of the tracking signal Tr, or a sequence thereof may be changed every rotation of the optical disk 200 other than the above-explained measure capable of changing the converted contents by the data converter 160.

<Forcible Insertion of Servo Level>

In the above-described embodiment, the image forming apparatus 10 is arranged in such a manner that when the dark dots are continued in a certain row, the laser light with the write level is applied in the continuous manner.

On the other hand, when the laser light having the write level is applied, the heat-sensitive layer 205 is discolored by energy of this laser light. The energy of the laser light employed in the discoloration is varied, namely, is not only changed time to time from the commencement of the irradiation in a transition manner, but also is changed under normal manner in response to various conditions due to individual differences in the optical disks 200. As a result, since the returned laser light when the laser light with the write level is applied is not made constant, such a condition may be conceived that the focusing control operation becomes unstable.

As a consequence, in the case that the laser light with the write level is continuously applied, there are certain possibilities that such a condition that the focusing control operation cannot correctly function happens to occur.

To this end, as an application example capable of avoiding the occurrence of such a condition, even in the case that the laser light with the write level should be continuously applied, such an application example may be conceived. That is, the laser light with the servo level is applied in a periodic manner within a short time period (apparently, within range where no adverse influence is given to discoloration), and the light reception signal Rv received within this short irradiation time period is employed as the return value so as to execute the focusing control operation based upon this return value.

<Another Example of Tracking Signal>

In the contrast priority mode, the phase of the tracking signal Tr is sequentially shifted by the same shift amount from the first rotation up to the seventh rotation. If the irradiation loci of the laser light is different from each other every rotation, then a method of this different irradiation loci can be sufficiently employed as the tracking signal Tr.

Figure 8B:
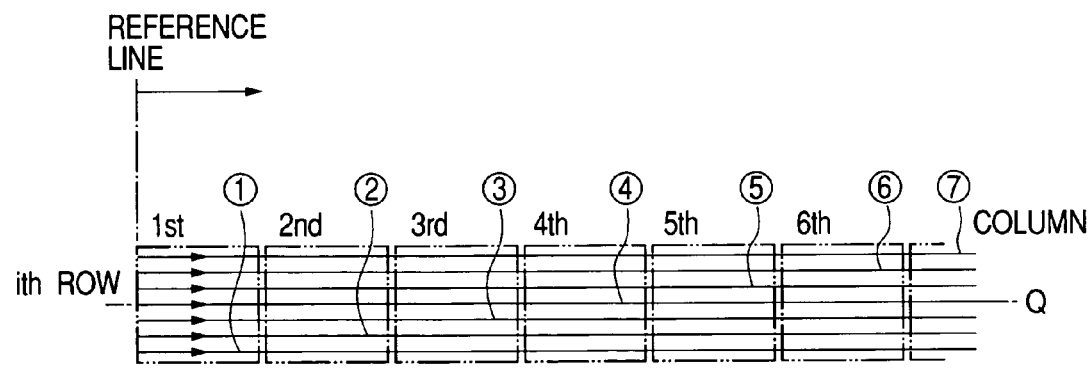

For instance, the tracking signal Tr is not made of a triangular-wave signal, but may be made of a DC voltage signal, and this DC voltage maybe made different from each other every rotation. Even when such a tracking signal Tr made of the DC voltage signal is employed, irradiation loci of the laser light are made different from each other every rotation as shown in FIG. 8B.

It should be understood that when a certain voltage is applied as the tracking signal Tr, there is no clear decision as to how the deviation amount can be obtained unless this deviation amount is previously acquired in an experimental manner. Furthermore, in accordance with such an arrangement capable of applying the DC voltage as the tacking signal Tr, there is a great possibility that formed images become ununiform due to an occurrence of noise and a fluctuation of sensitivities. As a result, it is desirably conceivable that an AC signal such as the above-described triangular-wave signal and a sine wave signal is employed, and a phase of this AC signal is shifted.

As a consequence, in view of such an aspect that the adverse influence caused by the occurrence of noise and the fluctuation in sensitivities is eliminated, in the time-saving mode, such a signal which is fixed to zero is not employed as the tracking signal Tr, but, such a triangular-wave signal having a smaller amplitude than the amplitude of the triangular-wave signal employed in the contrast priority mode may be preferably employed.

<Irradiation Times/Gradation Number of Laser Light>

In the above-described embodiment, in such a case that the image is formed in the 8 gradation in the contrast priority mode, the total irradiation time of the laser light with the write level capable of discoloring the heat-sensitive layer 205 is selected to be 0 time up to 7 times. Alternatively, the irradiation time may be set in such a manner that the higher the density is increased, the larger the irradiation time is increased. For instance, in the case that the gradation data (bits) are (000), (001), (010), (011), - - - , (111), a total irradiation time of the laser light with the write level per 1 row may be selected to be 0, 2, 4, 6,- - - , 14 times. As previously explained, if such a setting operation is made that the irradiation time of the laser light with the write level is increased, then such an image having a higher contrast ratio maybe formed. Alternatively, the increased amount of the total irradiation time may not be set in a fixing manner.

Furthermore, such a case has been explained in which the image having the 8 gradation as to 1 dot is formed, while the gradation data is assumed as 3 bits. However, the present invention is not limited to this example, but may be applied to another case. For example, while the gradation data is assumed as 8 bits, an image having 256 gradation as to 1 dot may be formed.

In the embodiment, the image for 1 row has been formed by feeding the optical pick-up 100 one time. Alternatively, an image for 1 row may be formed by feeding the optical pick-up 100 plural times. As explained above, in such a case that the image for 1 row is formed by feeding the optical pick-up 100 plural times, for example, 64 times, it is possible to form such an image in 256 (=4×64) gradation in such a way that density of 4 gradation is represented by feeding the optical pick-up 100 one time, and further, density is changed in each of the optical pick-up feeding operations 64 times.

<Image Forming by Color-Subtraction in Time-Saving Mode>

On the other hand, in the above-explained embodiment, in the case that the image is formed in the time-saving mode, the laser light having the write level has been simply applied/not-applied in the binary manner. Alternatively, an image may be formed, while the originally-provided gradation number indicated by the gradation data is reduced. For example, when the gradation data corresponds to (000) and (001), a total irradiation time of the laser light with the write level per 1 row is assumed as zero time; when the gradation data correspond to (010) and (011), a total irradiation time of the laser light with the write level per 1 row is assumed as two times; and when the gradation data correspond to (110) and (111), a total irradiation time of the laser light with the write level per 1 row is assumed as three times. Under such an assumption condition, the optical disk 200 may be rotated three times per 1 row, and an image may be formed by reducing the original gradation to 4 gradation. Apparently, the irradiation loci of the laser light may be set in such a manner that this irradiation loci may be made different from each other every rotation within the three rotations. Even when the image is formed by reducing the originally-provided total gradation number indicated by the gradation data, a total time required to form such an image may be shortened, as compared with that of the contrast priority mode, although the effect of shortening the image forming time is deteriorated.

In the case that the image is formed in the time-saving mode, the image forming apparatus 10 has been arranged in such a manner that the same gradation data as that of the contrast priority mode is stored in the frame memory 158. Alternatively, while this gradation data is processed by the host computer, either binary gradation data or color-subtractive gradation data which is produced by reducing an original gradation number may be stored in the frame memory 158, and then, an image may be formed based upon this stored gradation data in a similar manner to that of the contrast priority mode. In such an alternative case, since a total color number of this gradation data is binary, or becomes lower than the originally-provided color number, there is no difference between the above-described cases as to such a technical point that a total time required to form the image for 1 row is shortened.

<CLV System>

In the above-described embodiment, the image forming apparatus 10 has employed the CAV system by which while the optical disk 200 is rotated in the constant angular velocity, this optical disk 200 is irradiated with the laser light so as to form the image thereon. Alternatively, such a CLV system in which the linear velocity is constant may be employed. Since the CLV system need not employ such a control operation that the write level of the laser light is increased in connection with the movement of the irradiation position of the laser light to the outer circumferential side of the optical disk 200 (this control operation is however required in CAV system), there is no such a problem that the quality of the formed image is deteriorated due to the variation in the target values of the laser power.

<Tracking Control Using Groove>

In the above-described embodiment, the image forming apparatus 10 has been arranged by that the laser light is applied while the groove 202*a* is neglected. Even when the optical disk 200 has been set in such a manner that the label plane thereof is located opposite to the optical pick-up 100, there are some cases that the groove 202*a* is detected. In such a case, the irradiation position of the laser light may be controlled in conjunction with the tracking control by utilizing laser light returned from the groove 202*a*.

As viewed from the recording plane, in order that the groove 202*a* formed along the helical direction as shown in FIG. 6 is traced from the label plane, the rotation direction of the optical disk 200 by the spindle motor 130 must be again set to the reverse direction. If the groove 202*a* is traced from the outer circumferential side of the optical disk 200 toward the inner circumferential side thereof, then the rotation directions of the optical disk 200 can be made identical to each other.

The above-described control operation using the groove 202*a* especially becomes more effective not in such a case that the image is formed on the label plane, but in the case that the image is formed on the recording plane by employing the recording layer 202 as the discoloration layer.

<Arrangement of Dots>

In the above-described embodiment, a total column number has been selected to be the same "m" pieces from the first row up to the final "m" row. Alternatively, for instance, the further the column is directed to the outer circumferential side, the larger the total column number may be increased. In other words, the total column numbers may be made different from each other every column.

In the above-described embodiment, when the multiplication factor of the frequency employed in the PLL circuit 144 is set to such a value obtained by dividing the total column number "n" per 1 row by 8, 1 time period of the clock signal Dck is made coincident with such a time period during which the optical disk 200 is rotated by the angle equal to one column of the dot arrangement. As a consequence, since a multiplication factor of the PLL circuit 144 may be set in response to a total column number every row, this set multiplication factor may be properly applied to such an arrangement that total column numbers are made different from each other every row.

The optical disk having one discoloration layer has been used to describe the present invention. However, needless to way, multi discoloration layers may be formed in the optical disk to represent color image.

While has been described in detail, in accordance with the image forming apparatus and the image forming method of the present invention, it is possible to form the images in the high contrast ratio with respect to the optical disks in addition to the information recorded on the recording plane, while no additional apparatus is newly employed.

What is claimed is:

1. An optical disk recording apparatus for forming a visible image on an optical disk having a discoloration layer discolored by irradiation of laser light, the visible image formed by discoloring the discoloration layer, the optical disk recording apparatus comprising:

a rotating unit for rotating the optical disk;

an optical pickup that applies laser light to the discoloration layer of the optical disk, wherein the optical pickup varies a position of the laser light to be applied to the optical disk within a predetermined range in a radial direction of the optical disk;

a feeding unit that feeds a position of the optical pickup with respect to the optical disk, wherein the feeding unit fixes a position of the optical pickup with respect to the optical disk in the radial direction until the rotating unit rotates the optical disk a predetermined plurality of times, and moves the optical pickup in the radial direction with respect to the optical disk by a predetermined distance when the optical disk has been rotated the predetermined plurality of times;

an irradiation position operating unit that operates the optical pickup at a time the feeding unit fixes the optical pickup, so that the position of the laser light applied from the optical pickup varies in the radial direction within the predetermined range when the optical disk is rotated one time; and an irradiation position control unit that controls the irradiation position operating unit, at the time the feeding unit fixes the optical pickup, so that irradiation loci of the laser light on the optical disk are made different from each other every rotation.

2. The optical disk recording apparatus according to claim 1, wherein the range within which the position of the laser light operated by the irradiation position operating unit can vary is substantially equal to the distance by which to feeding unit feeds to position of the optical pickup.

3. The optical disk recording apparatus according to claim 2, wherein a spot diameter of the laser light applied on the optical disk is smaller than the distance by which the feeding unit feeds the optical pickup.

4. The optical disk recording apparatus according to claim 1, wherein the irradiation position operating unit varies the position of the laser light on the optical disk based on tracking signals having frequencies identical to each other and having amplitudes identical to each other.

5. The optical disk recording apparatus according to claim 4, wherein phases of the tracking signals are changed from each other every disk rotation.

6. The optical disk recording apparatus according to claim 1, wherein the discoloration layer of the optical disk is formed on a label surface disposed opposite to a recording surface having a recording layer.

7. The optical disk recording apparatus according to claim 6, wherein a tracking control for tracing a groove on the optical disk is not carded out.

8. The optical disk recording apparatus according to claim 7, wherein the tracking control is carded out when a data is recorded on the recording layer.

9. The optical disk recording apparatus according to claim 1, wherein intensity of the laser light is defined as on/off of the light irradiation.

10. The optical disk recording apparatus according to claim 1, wherein intensity of the laser light has a write level by which the discoloration layer is discolored when the laser light is applied thereto, and a servo level by which the discoloration layer is not discolored when the laser light is applied thereto.

11. The optical disk recording apparatus according to claim 1, wherein the discoloration layer includes a heat-sensitive member which is discolored by heat generated when the laser light is applied thereto.

12. The optical disk recording apparatus according to claim 1, wherein the discoloration layer includes a member which is discolored by light when the laser light is applied thereto.

13. The optical disk recording apparatus according to claim 1, wherein the rotating unit rotates a rotating speed of the optical disk according to a CAV system.

14. The optical disk recording apparatus according to claim 13, wherein the rotating unit includes a spindle motor for rotating the optical disk and a rotation detector for generating a signal having a frequency in response to the rotating speed of the spindle motor, and the rotation speed is controlled so that the frequency generated by the rotation detector becomes constant.

15. The optical disk recording apparatus according to claim 1, wherein the rotating unit rotates a rotating speed of the optical disk according to a CLV system.

16. The optical disk recording apparatus according to claim 1, wherein the feeding unit comprises a stepping motor.

17. The optical disk recording apparatus according to claim 1, wherein the discoloration layer of the optical disk is formed as a recording layer on a recording surface.

18. The optical disk recording apparatus according to claim 17, wherein an image is formed at an outer circumference side of the optical disk after data is recorded on the recording surface.

19. A method of forming a visible image on an optical disk having a discoloration layer discolored by irradiation of laser light, the visible image formed by discoloring the discoloration layer, the method comprising:

rotating the optical disk;

causing an optical pickup to apply laser light to the discoloration layer of the optical disk, fixing a position of the optical pickup with respect to the optical disk in the radial direction until the optical disk is rotated a predetermined plurality of times;

moving the optical pickup in the radial direction with respect to the optical disk by a predetermined distance when the optical disk has been rotated the predetermined plurality of times; and operating the optical pickup at the time of the fixing step so that the position of the laser light applied from the optical pickup varies in the radial direction within a predetermined range during the time optical disk is rotated once and irradiation loci of the laser light on the optical disk are made different from each other every rotation.

* * * * *